United States Patent [19]

Matison

[11] 4,200,893
[45] Apr. 29, 1980

[54] INSTRUCTION INDICATING APPARATUS FOR A RECORD AND/OR PLAYBACK DEVICE

[75] Inventor: Gary G. Matison, Wilton, Conn.

[73] Assignee: Dictaphone Corporation, Rye, N.Y.

[21] Appl. No.: 907,035

[22] Filed: May 17, 1978

[51] Int. Cl.$^2$ ............................................. G11B 15/18
[52] U.S. Cl. .......................... 360/72.1; 179/100.1 PS
[58] Field of Search ........................... 360/72, 72.1, 9; 129/100.1 PS

[56] References Cited

U.S. PATENT DOCUMENTS

| | | | |
|---|---|---|---|
| 3,911,489 | 10/1975 | Spence | 360/72 |
| 3,918,027 | 11/1975 | Lechner | 360/72 |
| 4,000,518 | 12/1976 | Stearns | 360/72 |
| 4,040,100 | 8/1977 | Chan | 360/72 |
| 4,041,249 | 8/1977 | Matz | 360/72 |
| 4,066,349 | 1/1978 | Flint | 360/72 |
| 4,092,680 | 5/1978 | Sander | 360/72 |

FOREIGN PATENT DOCUMENTS 2263438 12/1972 Fed. Rep. of Germany .............. 360/72

*Primary Examiner*—John H. Wolff
*Attorney, Agent, or Firm*—Curtis, Morris & Safford

[57] ABSTRACT

Apparatus for displaying the relative locations of particular information recorded on a movable record medium, such as a magnetic tape, the particular information being represented by a predetermined signal. Electronic pulses are generated corresponding to the movement of predetermined amounts of the record medium past a reference position. A bidirectional counter counts these pulses so as to derive a count representing the amount of medium which has been moved past the reference position, and also representative of the relative position of that record medium which then is juxtaposed the reference position. An indicating signal is produced in response to the predetermined signal; and a memory, having a plurality of storage locations corresponding to the counts of the counter, stores an indicating signal at a storage location which corresponds to the present count of the counter at the time that the indicating signal is produced. A display is responsive to the signals stored in the memory for displaying the locations on the record medium at which the predetermined signals are recorded. In one embodiment, the display not only provides indications of the locations of recorded predetermined signals, but also provides a cursor corresponding to the approximate present position on the record medium whereat information then is being recorded or played back by the user of the apparatus.

34 Claims, 26 Drawing Figures

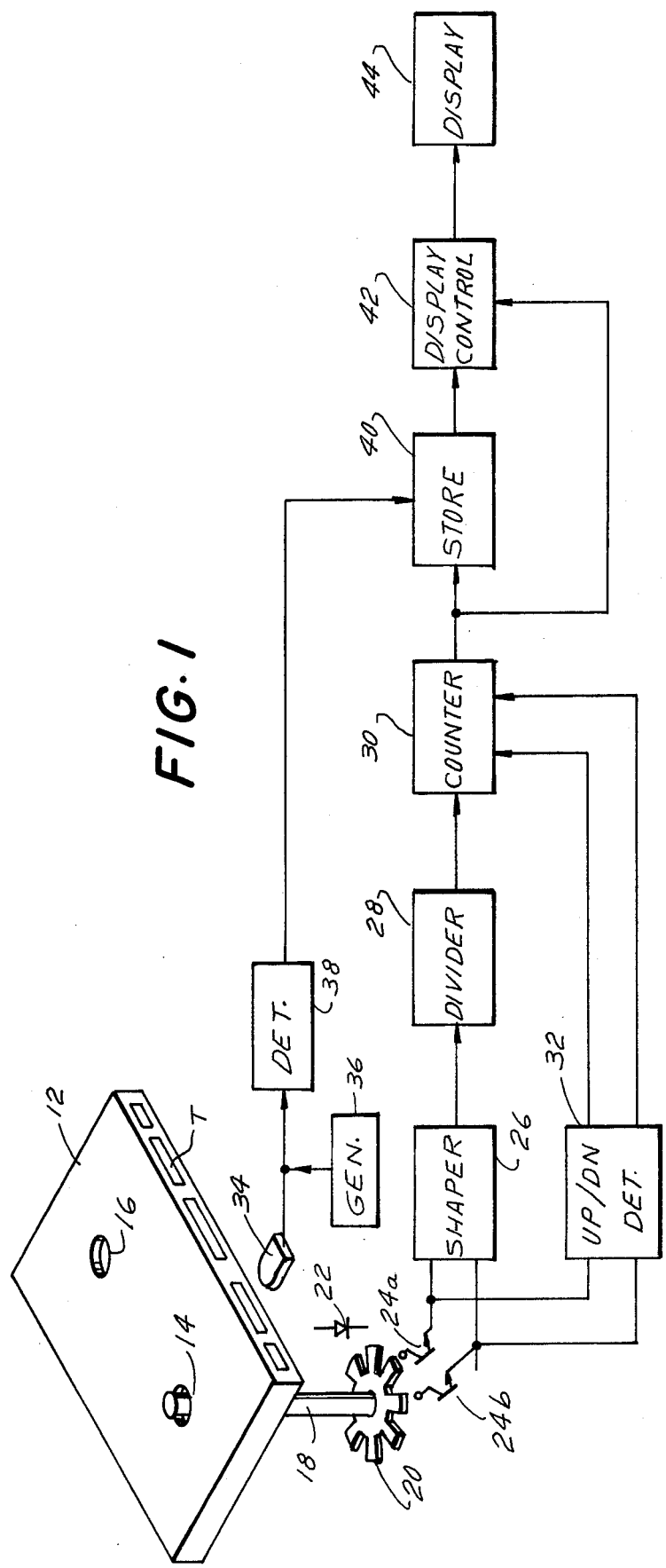
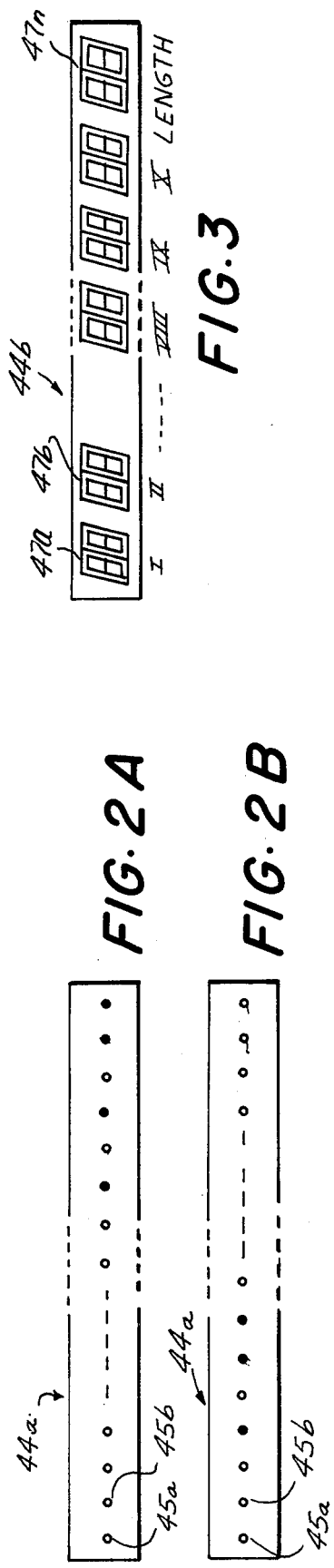

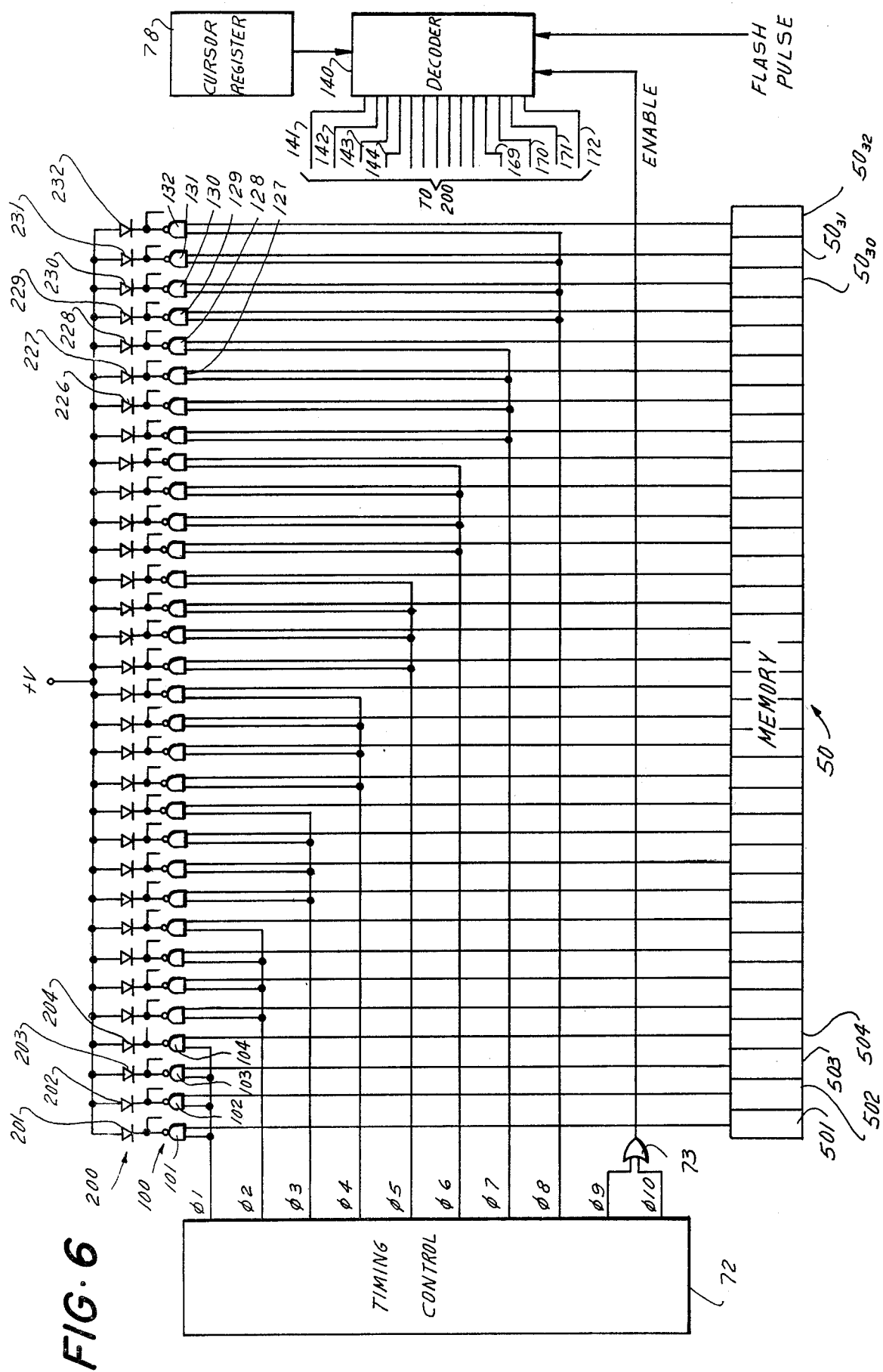

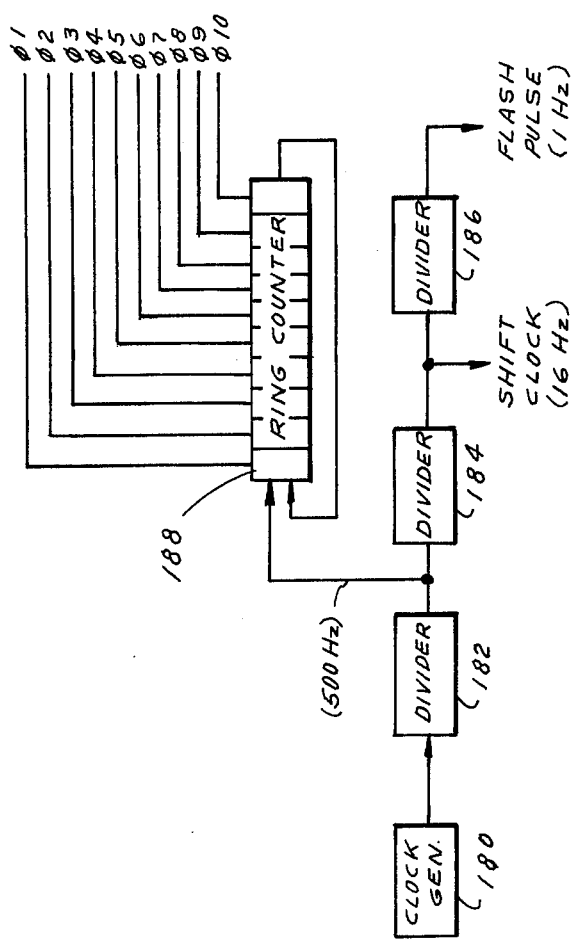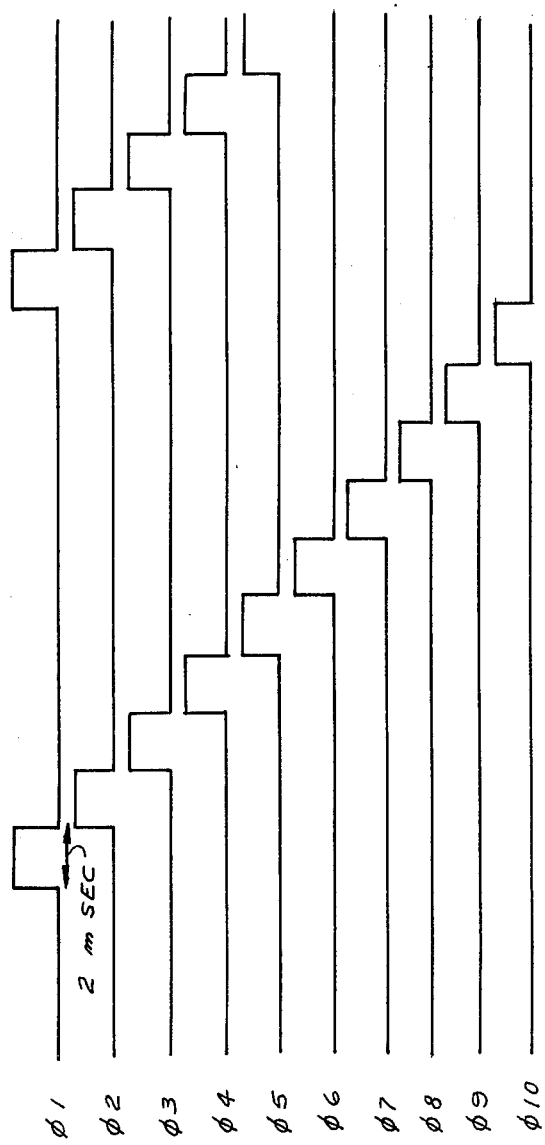

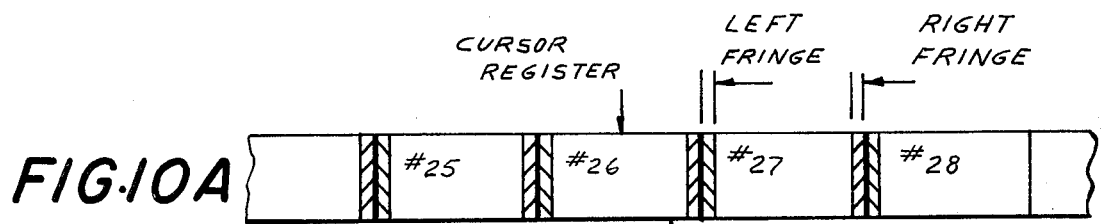
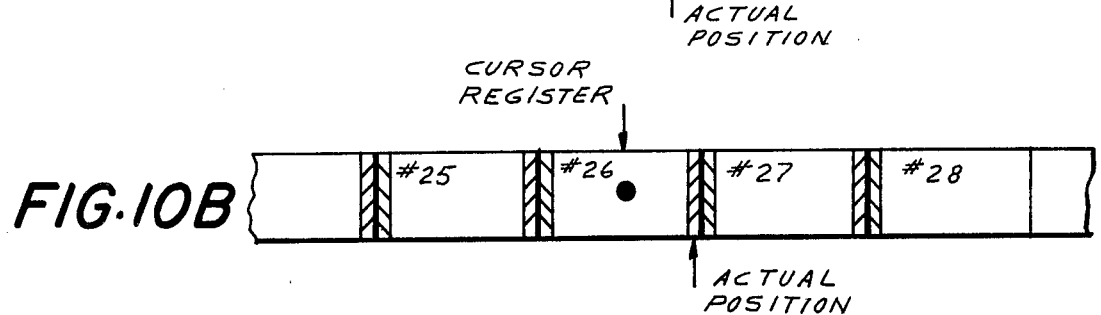
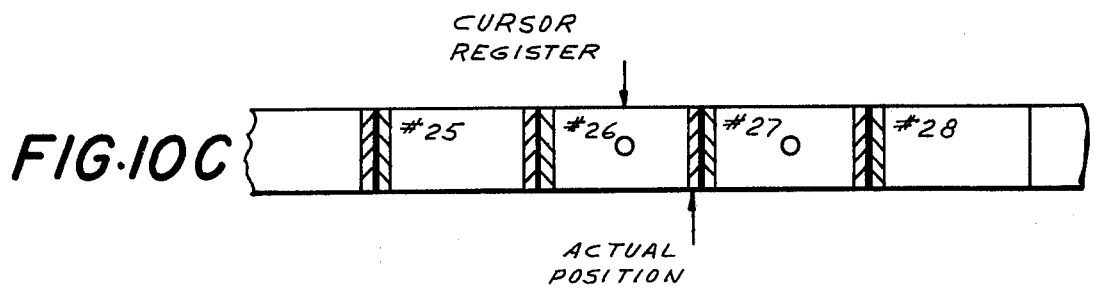
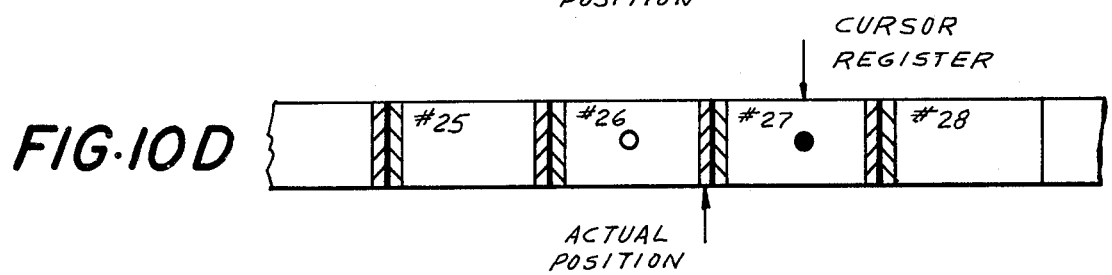
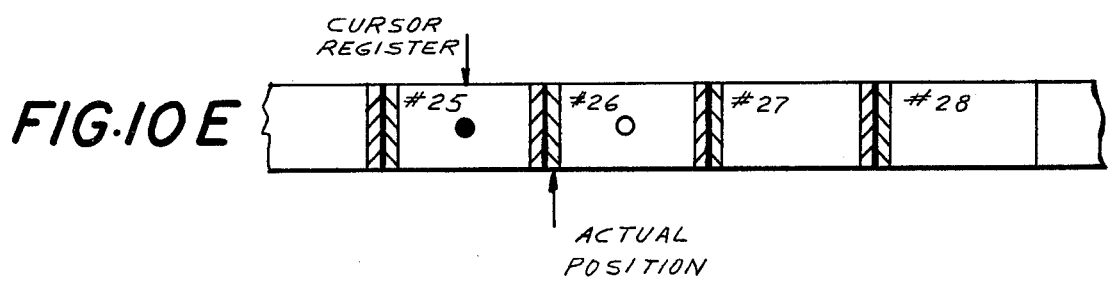

INSTRUCTION INDICATING APPARATUS FOR A RECORD AND/OR PLAYBACK DEVICE

BACKGROUND OF THE INVENTION

This invention relates to instruction indicating apparatus and, more particularly, to such apparatus which is adapted for use in a recording/playback system so as to provide a display of particular information, such as instructions, which is recorded on a movable record medium, and wherein the apparatus is fully electronic.

In many recording/playback devices wherein information is recorded on and/or played back from a record medium, such as a magnetic tape, a magnetic sheet, a disc, or the like, it often is desirable to provide indications of the locations of particular information on that record medium. For example, in dictating equipment, a user may record various instructions at particular locations of the record medium. In transcribing the dictated information, it is advantageous to provide the transcriptionist with indications of the locations whereat the particular instructions are recorded so as to facilitate the preparation and transcription of that information. Accordingly, in prior art dictation equipment, the locations of such instructions are provided by marking an indicating slip, such as an index scale which is marked by a pencil, a solenoid-activated scribing instrument, a heater element, or the like. Of course, the marked indicating slip usually originates at the dictator's apparatus and, therefore, must accompany the record medium to the transcriber's apparatus in order to be properly used. Hence, there is the possibility that the marked index scale will be lost or otherwise separated from the record medium.

In a central dictation system wherein each of a plurality of remotely situated dictators may dictate information onto a centrally disposed record medium, particular signals representing the end of dictation of a particular dictator may be generated. It is desirable to display the relative locations of these end-of-dictation signals so as to apprise the transcriptionist of the length of a particular piece of dictation which is being transcribed. In such a central dictation system, the use of marked index scales of the type described above is not practical.

Furthermore, when digital data is recorded on a record medium, various blocks of data may be identified by recording corresponding identifying signals relating to the type, length, composition or other characteristics of that data. It is advantageous to provide indications of such identifying signals so as to facilitate a rapid selection and access of a desired block of data.

It has heretofore been proposed to record predetermined identifying signals on the record medium during a recording operation so as to identify the location and type of data associated with such signals. In the environment of a dictation system, these recorded signals are instruction signals which serve to locate a position of an associated instruction. As described in U.S. Pat. No. 3,040,135, these recorded instruction signals are tone signals which are not audibly sensed during a playback operation. In preparation of a transcribing operation, the record medium is rapidly scanned to detect the presence of these tone signals and to mark an index strip which is scanned in synchronism with the scanning of the record medium. Unfortunately, if the record medium is a magnetic tape cassette, a magnetic belt, a magnetic disc, or other discrete media, a separate index slip is needed for each medium. Either time-consuming, and often frustrating, operations must be performed to suitably load the index slip in an appropriate marking mechanism for each record medium, or complex and costly automatic devices must be provided for this purpose. In addition, the use of such index slips is not readily desirable in the environment of a central dictation system.

The foregoing problems associated with the marking of index slips generally are overcome in accordance with the apparatus disclosed in U.S. Pat. No. 4,051,540, assigned to the assignee of the present invention. In this apparatus, rather than using an index slip, a series of light sources, such as light emitting diodes (LED's) are selectively energized to provide indications of the locations whereat instruction signals are recorded. In preparation for a transcribing operation, the record medium, which may be a magnetic tape cassette, is scanned to detect the locations of recorded instruction signals, or tones. Synchronized with this scanning of the magnetic tape, a wiper element scans successive LED's. Accordingly, the one LED which is contacted by the wiper element at the time that an instruction tone signal is reproduced is energized. At the completion of the scanning operation, the selective energization of the LED's provides a visual indication as to the locations of recorded instruction signals. Furthermore, and in order to reference the energized LED's to an index scale, a slidable index, previously marked in time gradations, is advanced as the record medium is scanned. At the conclusion of this scanning operation, not only are the LED's properly energized, but the index scale provides a close approximation of the overall length of recorded information. Thus, by referencing the energized LED's to this index scale, the relative locations of recorded instruction signals are ascertained.

Although the just-described instruction indicating apparatus functions satisfactorily, this apparatus utilizes a mechanical assembly to scan the LED's and to display the index scale. Such a mechanical assembly adds to the overall cost of construction to the system with which the indicating apparatus is used. Furthermore, in that apparatus, a constant zero reference position for the index scale is not provided. Rather, a so-called "floating zero" is used, this floating zero being dependent upon the overall length of dictated information. It is believed that a user would prefer a fixed, left-margin zero point for the index scale. Still further, the versatility of the instruction indicating apparatus of the aforedescribed type is relatively limited. That is, it generally is capable only of providing indications of the locations of instructions which are recorded on the record medium. It is advantageous if various types of instructions can be identified, and the locations of such different types of instructions be displayed.

OBJECTS OF THE INVENTION

Therefore, it is an object of the present invention to provide improved indicating apparatus which avoids the aforenoted disadvantages of prior art apparatus and which provides increased versatility.

Another object of this invention is to provide indicating apparatus for use with a recording/playback system and which displays the locations of particular information recorded on the record medium used with that system.

A further object of this invention is to provide an all-electronic display apparatus for use with a recording/playback system which displays the relative locations of particular information recorded on the record medium as well as the present position of the record medium whereat information that is being recorded or played back.

An additional object of this invention is to provide improved instruction indicator apparatus for use in a dictation system wherein an electronic display provides visual indications of the locations of particular recorded information as well as a visual indication of the present position of the record medium.

Yet another object of this invention is to provide improved visual display apparatus for use in recording/playback systems, wherein such apparatus is esthetically pleasing and which provides various instruction and cursor indications.

Various other objects, advantages and features of the present invention will become readily apparent from the ensuing detailed description, and the novel features will be particularly pointed out in the appended claims.

SUMMARY OF THE INVENTION

In accordance with the present invention, apparatus is provided for displaying the relative locations of particular information, represented by a predetermined signal, which is recorded on a movable record medium. Electronic pulses are generated in correspondence with the movement of the record medium, and these pulses are counted in a direction depending upon the direction of movement. An indicating signal is produced in response to each predetermined signal; and a memory having a plurality of storage locations corresponding to the counts of the electronic pulses stores an indicating signal at a storage location corresponding to an instantaneous count at the time that the indicating signal is produced. A display is responsive to the signals stored in the memory for displaying the locations on the record medium at which the predetermined signals are recorded.

In one embodiment, the display also is selectively energized as a cursor to provide an indication of the instantaneous pulse count, thereby representing the present position of the record medium with respect to a reference position. The apparatus is particularly adapted for use in dictation/transcribing systems so as to provide indications of particular instructions which may be recorded on the record medium and which may be of importance in carrying out a transcribing operation.

BRIEF DESCRIPTION OF THE DRAWINGS

The following detailed description, given by way of example, will best be understood in conjunction with the accompanying drawings in which:

FIG. 1 is an overall block diagram of recording/playback apparatus with which the present invention finds ready application;

FIGS. 2A and 2B show one embodiment of the display which can be used with this invention;

FIG. 3 shows another embodiment of the display;

FIG. 6 is another embodiment of a display and display driving apparatus;

FIG. 7 is a logic diagram of a portion of the display driving apparatus;

FIGS. 8A–8J are waveform diagrams which are useful in understanding the operation of the apparatus shown in FIG. 7;

FIGS. 10A–10E are explanatory diagrams showing how the apparatus shown in FIG. 9 operates.

DETAILED DESCRIPTION OF CERTAIN PREFERRED EMBODIMENTS

Figure 4:
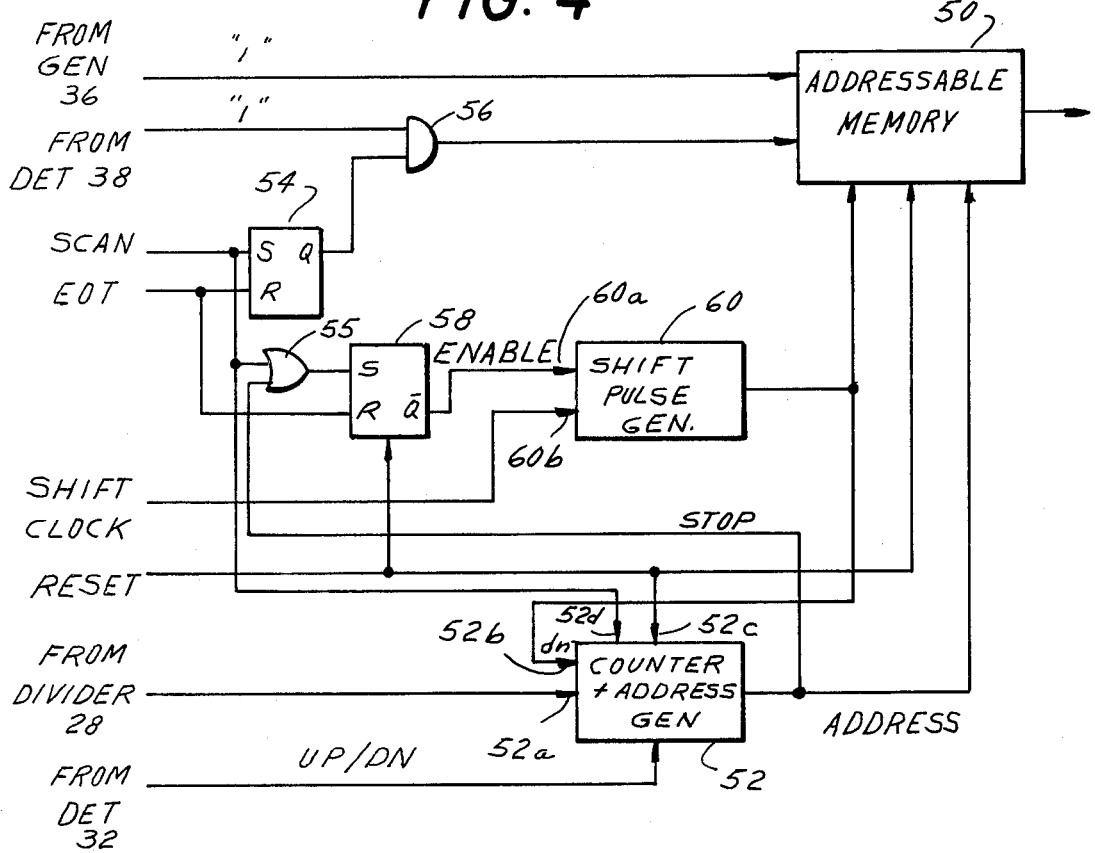
FIG. 4 is a logic diagram of one portion of the present invention.

Turning now to the drawings, and particularly to FIG. 1, the present invention will be described in the environment of a record/playback system and, more particularly, in the environment of a dictation system which is capable of recording dictated information onto a magnetic record medium and/or to reproduce dictated information from that medium. In the interest of simplification, the entire dictation system is not shown herein. Rather, only that portion of the system which is used to record predetermined signals, such as instruction tone signals, onto the record medium and to reproduce and utilize such signals is illustrated. Furthermore, it is here assumed that the record medium is a magnetic tape T of the type housed in a tape cassette 12, the tape cassette having usual supply and take-up reels between which tape T is bidirectionally transported in accordance with a conventional tape transport (not shown) which is selectively controlled for carrying out a dictation or transcription operation. As is usual, tape cassette 12 is provided with apertures 14 and 16 therein, these apertures being adapted to receive a supply spindle 18 and a take-up spindle (not shown) for selectively driving the respective reels within the tape cassette so as to correspondingly transport tape T either from the supply reel to the take-up reel or in the opposite direction.

In order to provide an indication of the direction in which tape T is transported and the amount of tape which has been moved past a reference position, such as a record/playback head, pulses are generated in synchronism with the tape movement. It is appreciated that supply spindle 18 rotates in one direction when tape T is transported in the forward direction and in the opposite direction when the tape is transported in the reverse, or rewind direction. This rotation of supply spindle 18 is sensed and used as an indication of the amount of tape T which has been transported. In this regard, a chopper disc 20 is secured to supply spindle 18 and is rotatable therewith. As shown in FIG. 1, chopper disc 20 includes a plurality of fins. These fins are utilized to intermittently interrupt a light beam, thereby deriving pulses corresponding to the rotation of the chopper disc and, therefore, the quantity of tape T which has been transported. This light beam is produced by a light source 22, shown herein as a light emitting diode (LED), and the light beam is directed to a pair of photosensors 24a, 24b, shown herein as phototransistors. Chopper disc 20 is interposed between light source 22 and photosensors 24a, 24b, such that the light beam is interrupted when a fin is rotated into the optical path between the light source and the photosensors. As is known, the current flowing through a phototransistor is modulated in accordance with the amount of light impinging on the phototransistor. Hence, current pulses are produced by the phototransistors as chopper disc 20 interrupts the light beam emitted by LED 22.

A circuit formed of a signal shaping circuit 26, a frequency divider 28, a bidirectional counter 30 and an UP/DOWN detector 32 is connected to phototransistors 24a, 24b, to utilize the current modulations produced by the phototransistors and thereby provide an indication of the amount of tape T which has been transported. Signal shaping circuit 26 is connected to the phototransistors and is adapted to shape the signals supplied thereto by the phototransistors so as to produce a single pulse train. The frequency of this pulse train is, therefore, determined by the speed at which tape T is transported and, hence, the angular velocity of chopper disc 20. Preferably, the pulses produced by signal shaping circuit 26 are of uniform amplitude and duration. Accordingly, the signal shaping circuit may include various amplifiers, differentiating circuits, monostable multivibrator circuits, and the like.

As a numerical example, if the length of tape T in tape cassette 12 permits a total dictation time of thirty minutes, then signal shaping circuit 26 will produce 2,048 pulses for a full length of tape T. Frequency divider 28 is connected to signal shaping circuit 26 to receive the pulses generated thereby and to divide the frequency of such pulses so as to reduce the total number of pulses produced for a full length of tape. Hence, a pulse is provided at the output of frequency divider 28 when a predetermined length, or increment, of tape T has been transported past a reference position. Hence, the pulses derived by frequency divider 28 serve to divide the length of tape T into a corresponding number of increments, or blocks. The number of such blocks, and thus the number of pulses produced for a full length of tape, may be as desired. In one contemplated embodiment, frequency divider 28 is omitted.

Counter 30 is coupled to the output of frequency divider 28 and is adapted to count the pulses supplied thereto by the frequency divider. In a preferred embodiment, counter 30 is a bidirectional counter so as to increment its count in response to each pulse when tape T is transported in the forward direction, and to decrement its count in response to each pulse when tape T is transported in the rewind direction. UP/DOWN detector 32 is coupled to counter 30 and is adapted to supply UP or DOWN command signals to the counter depending upon the detected direction in which tape T is transported. For this purpose, UP/DOWN detector 32 has its input connected to the outputs of phototransistors 24a and 24b. As is known, the direction in which tape T is transported is represented by the phase difference between the output signals produced by the phototransistors. That is, these respective phototransistors produce equal but phase displaced output signals. Typically, the phase displacement between such output signals is 90°. Hence, if the modulated currents supplied to UP/DOWN detector 32 by phototransistors 24a and 24b differ in phase by 90°, the UP/DOWN detector supplies a count UP signal to counter 30. However, if the phase displacement between the modulated currents which are supplied to the UP/DOWN detector is equal to 270°, then the detector supplies a count DOWN signal to counter 30. Thus, when tape T is transported in the forward direction, the count of counter 30 is incremented. However, when tape T is rewound, the count of counter 30 is correspondingly decremented. As is appreciated, the instantaneous count of counter 30 corresponds to the amount of tape T which has been transported and, therefore, this count corresponds to the approximate position of the tape which then is juxtaposed the reference position. It is seen that counter 30 represents the "approximate position" of tape T because, as mentioned hereinabove, each pulse supplied to the counter corresponds to some discrete block of tape having finite length. Of course, the count of counter 30 does not change until this entire block has been transported past the reference position.

A primary object of this invention is to provide an indication of the locations on tape T at which predetermined, or instruction signals, are recorded. Such predetermined signals are recorded on tape T as tone signals of a predetermined frequency. It is contemplated that such tone signals may be recorded in the form of coded bursts such that these tone signals can be decoded to represent a particular type of instruction. For example, one encoded tone burst may represent an end of letter, another encoded burst may represent a correction requirement, yet another encoded burst may represent a priority designation for the dictated information, etc. Such tone signals are recorded by a record/playback head 34 which, if desired, may be the very same record/playback head which is used to record dictated information or, as an alternative, may be a separate transducer. A tone generator 36 is selectively energized by a user of the system to supply the tone signal, or encoded tone signal, to head 34 for recording on tape T. In addition, and as figuratively shown in FIG. 1, the recording of this tone signal is detected, as by supplying the output of tone generator 36 to a suitable tone detector 38. Thus, when a tone signal is recorded on tape T, a suitable indication thereof is provided at the output of detector 38, this suitable indication being a predetermined digital signal. Also, detector 38 is adapted to detect when head 34 reproduces a tone signal, or encoded tone signal, from tape T, for example, in preparation of a transcribing operation. Hence, as shown in FIG. 1, the output of record/playback head 34 also is coupled to tone detector 38.

The indicating signal produced by tone detector 38 in response to the recording or playing back of a tone signal is displayed so as to provide an indication of the locations on tape T whereat the tone signals are recorded. For this purpose, a storage circuit 40, a display control circuit 42 and a display device 44 are provided. As will be described in greater detail below, storage circuit 40 preferably is an addressable memory having a plurality of addressable storage locations whereat the indicating signal provided by tone detector 38 may be stored. Hence, one input of storage circuit 40 is connected to the output of tone detector 38. Furthermore, the particular locations whereat the indicating signals are stored, that is, the addressed storage locations, are determined by the instantaneous, or then present, count of counter 30. That is, the count then obtained by this counter is used as an address signal to address, or gain access to, a particular storage location within the storage circuit.

The output of storage circuit 40 is connected to one input of display control circuit 42, and the output of counter 30 is connected to another input of the display control circuit. The output of display control circuit 42 is connected to display device 44 and is adapted to control, or drive the display device so as to display the locations whereat the tone signals are recorded along the length of tape T. In addition, display device 44 is adapted to provide a cursor indication of the approximate present position of tape T with respect to a reference position. As will be described in greater detail below, display control circuit 42 selectively controls display device 44 so as to provide both of these indications.

In one embodiment of the present invention, display device 44 is comprised of an array of selectively energized light sources, such as a linear array of selectively energized LED's. Accordingly, a discrete number of LED's must be provided. Hence, each LED is associated with a block of tape T of finite length. If a tone signal is recorded somewhere in a particular block, the associated LED is energized to provide an indication thereof. Furthermore, depending upon the present position of tape T, a corresponding LED is energized as a cursor to provide an indication of this present position. In order to distinguish between the cursor and the locations of the recorded tone signals, the particular LED which is energized as the cursor is flashed, or oscillates, at a relatively low rate. This linear array of LED's is represented in FIGS. 2A and 2B.

A generalized description of the overall operation of the apparatus shown in FIG. 1 now will be described with particular reference to the LED arrays shown in FIGS. 2A and 2B. Let it first be assumed that tone signals are being recorded on tape T under the control of a dictator during a dictate operation. As tape T is transported, pulses are produced by signal shaping circuit 26 and, after being divided, are counted by counter 30. While tape T is being transported in the forward direction, these pulses increment the count of counter 30. If tape T is rewound, for example, if the dictator wishes to review his recorded information, these pulses decrement the count of the counter. The instantaneous count of counter 30 is supplied to display control circuit 42 which drives display device 44 so as to provide a cursor indication of the present position of tape T. As a numerical example, if 2,048 pulses are produced by shaping circuit 26 for a full length of tape T, then one pulse is produced thereby for every 1.7 inches of tape which is transported. Let it be assumed that display 40 is formed with 32 LED's, such as LED's 45a, 45b, ... provided in display 44a shown in FIGS. 2A and 2B. If frequency divider 28 has a frequency dividing ratio equal to 64, then the 2,048 pulses produced by signal shaping circuit 26 are divided down to 32 pulses, that is, one pulse for each LED. Thus, each count of counter 30 is associated with a respective LED, and display control circuit 42 energizes that LED which is associated with the instantaneous count of counter 30. For example, if the count of counter 30 is a count of 2, then the second LED, for example, LED 45b, is flashed as the cursor. When the count of counter 30 is incremented to a count of 3, then the next LED is flashed as the cursor, and so on. Of course, if tape T is reversed, then the count of counter 30 is decremented, for example, from a count of 3 back to a count of 2, and the associated LED likewise is flashed as the cursor to provide a visual indication of the present position of tape T.

Let it be assumed that when the count of counter 30 has been incremented to some particular count, such as a count of 8, tone generator 36 is energized so that head 34 records a tone signal on tape T. Since the count of counter 30 has reached a count of 8, it is appreciated that this tone signal will be recorded somewhere during the ninth block on the tape.

The generated tone signal is detected, as by tone detector 38, whereby an indicating signal is supplied to storage circuit 40 representing that a tone signal then is being recorded. This indicating signal is stored in the storage location having an address corresponding to the then existing count of counter 30, that is, address number 8. Of course, as tape T is further transported, and if additional tone signals are recorded at various locations along the length of the tape, then indicating signals corresponding to each of these additional tone signals are stored at storage locations in storage circuit 40 having addresses determined by the counts of counter 30 which obtain at the times that the tone signals are generated and recorded.

The stored indicating signals in storage circuit 40 are supplied to display control circuit 42 whereby these stored indicating signals are displayed by the LED's 45a, 45b, ... As will be described in greater detail below, if storage circuit 40 is provided with a respective storage location for each LED, then those LED's corresponding to the storage locations wherein indicating signals are stored are energized by display control circuit 42. Thus, the LED's are selectively energized to provide a cursor indication, as described above, and also to provide indications of the relative locations along tape T whereat tone signals are recorded.

The foregoing has described the operation of the apparatus shown in FIG. 1 for a dictation and tone signal recording operation. The manner in which this apparatus operates to facilitate the preparation of a transcribing operation now will be explained. Let it be assumed that after dictation is completed, tape T is not rewound. That is, the tape remains at its farthest advance position attained during the dictation operation. In preparing to transcribe the dictated information, a transcriptionist first rewinds tape T to detect the locations therealong at which tone signals are recorded. This is achieved by performing a "scan" operation, initiated by the manual actuation of an appropriate SCAN switch (not shown). During this scan operation, tape T is rewound to its beginning position and head 34 and tone detector 38 are suitably energized so as to detect the tone signals which are reproduced from the tape while the tape is being rewound. As a numerical example, the tone signal may be recorded as a 15 Hz tone signal so that, during reproduction of audio information, the frequency of this tone signal is well below the audio frequency band and, therefore, does not interfere with the reproduced audio information. Typically, tape T is rewound at a speed which is about ten times greater than the normal signal reproducing speed, so that the tone signal which is reproduced during this scan operation has a frequency of approximately 150 Hz.

When the SCAN switch is actuated, tone detector 38 simulates the detection of a tone signal so as to supply an indicating signal to storage circuit 40 to be stored in the storage location then addressed by the count of counter 30. As will be described in greater detail below, when this scan operation is commenced, counter 30 is preset to a predetermined count-for example, to the count associated with the address of the storage location in storage circuit 40 which, in turn, is associated with the right-most LED included in display 44a (FIGS. 2A and 2B). Thus, at the commencement of the scan operation, an indicating signal is stored in the storage location of storage circuit 40 which is associated with the right-most LED of the display 44a.

As tape T is rewound, phototransistors 24a and 24b supply suitable pulse indications to signal shaping circuit 26 and to UP/DOWN detector 23. The UP/DOWN detector senses the phase displacement of the pulse signals supplied thereto so as to apply a count down command signal to counter 30. As a consequence thereof, the pulses which are supplied to the counter circuit by frequency divider 28 serve to decrement the count of the counter. As the count of counter 30 is decremented, successive storage locations in storage circuit 40 are addressed. More particularly, these storage locations which are associated with LED's 45a, 45b, . . . of display 44a are successively addressed in a right-to-left orientation. Whenever a tone signal which had been recorded on tape T is reproduced by head 34, tone detector 38 supplies an indicating signal to storage circuit 40. This indicating signal is stored in the storage location then being addressed by counter 30.

Of course, while storage circuit 40 is supplied with indicating signals which are stored at the storage locations successively addressed by counter 30, display control circuit 42 is supplied both with the stored indicating signals and with the progressively decrementing count of counter 30. The display control circuit thus selectively energizes those LED's which are associated with the storage locations of storage circuit 40 in which indicating signals are stored so as to provide an indication of the relative locations of the tone signals which had been recorded along tape T. The display control circuit also flashes the particular LED which is associated with the instantaneous count of counter 30 so as to provide a cursor indication of the approximate present position of tape T relative to a reference position, such as to a transcribe transducer.

Once tape T has been fully rewound during this scan operation, it is appreciated that, insofar as the LED's which indicate the relative locations along the length of tape at which tone signals are recorded, the LED's are selectively energized in a right-to-left orientation. For example, as shown in FIG. 2A, the right-most LED is energized to indicate the start of the scan operation. The next left adjacent LED also is energized to indicate the location of the last tone signal which had been recorded on tape T; that is, the last tone signal which had been recorded by the dictator. The next left adjacent LED is not energized, indicating the absence of a tone signal in the block of tape which is associated with that LED. In accordance with a particular numerical example, if the full length of tape T is capable of recording thirty minutes of dictation, and if this tape normally is advanced at a speed of 115/16 inches per second, then each LED is associated with a block that is about 109 inches long and is capable of recording about 56¼ seconds of dictation. Thus, the third LED (right-to-left orientation) shown in FIG. 2A which is not energized indicates that during this 109 inch or 56¼ second block of tape, no tone signal is recorded.

Continuing in the right-to-left direction in FIG. 2A, the fourth LED is energized, indicating the presence of a tone signal recorded in the associated block of tape. The fifth LED is not energized, but the sixth LED is. Then, further LED's are not energized, indicating that no tone signals are recorded at the beginning portion of tape T.

It is appreciated that, depending upon the total length of tape upon which dictation has been recorded, that is, the total length of tape which has been rewound during this scan operation, the cursor will have been advanced over a corresponding number of LED's. Thus, the final position of this cursor will be at some location between the left-most LED 45a and the right-most LED. That is, the zero reference position representing the beginning of tape T is randomly located. It is preferred that this zero reference position be fixed at the left-most LED 45a once tape T has been fully rewound. As will be described in greater detail hereinbelow, this fixing of the zero reference position at the left-most LED is achieved at the completion of the scan operation. The selectively energized LED's shown in FIG. 2A are sequentially shifted to the left by display control circuit 42, such that the left-most LED 45a is the zero reference position representing the beginning of tape T, and the right-most energized LED represents the length of tape T upon which dictation is recorded. The remaining LED's to the right of the last energized energized LED all are unenergized, representing the presence of blank tape upon which no dictation has been recorded. Thus, the array of LED's from the left-most, or zero reference position LED 45a to the last energized LED provides an index scale corresponding to the total length of dictation. Furthermore, those energized LED's which are disposed between the zero reference position LED and the end of dictation LED indicate the relative locations at which tone signals have been recorded.

In the foregoing description of the embodiment shown in FIG. 1, it had been assumed that display 44 is comprised of a linear array of LED's 44a, as shown in FIGS. 2A and 2B. If desired, the display may be formed of two or more such linear arrays, each array being associated with a different type of instruction, and each instruction being represented by a particular encoded tone signal. Thus, one array may represent the locations of recorded end-of-letter instructions, another array may represent the locations of recorded secretary instruction signals, another array may represent the locations of "priority" instructions, and the like. To facilitate this display of different types of instructions, storage circuit 40 may be formed of a plurality of addressable storage registers, each storage register being associated with a particular type of instruction and each storage register having a number of storage locations equal to the number of LED's included in the associated display. As another example, the indicating signal which is stored in a particular storage location in storage circuit 40 may be encoded so as to represent a respective instruction. When the stored indicating signals are applied to display control circuit 42, an LED in the proper array is energized as a function of the particular storage location in which the encoded indicating signal is stored and as a function of the instruction which is represented by the encoded indicating signal.

As another modification of the embodiment shown in FIG. 1, display 44 need not be limited solely to one or more arrays of LED's, or other selectively energizable light sources. Display 44 may include a plurality of numerical indicators, as represented by display 44b shown in FIG. 3. In this embodiment, each numerical indicator 47a, 47b, . . . 47n may be formed of conventional seven-segment arrays adapted to provide a visual indication of the location of instruction signals at a particular length (for example, in inches or in minutes) along tape T. A seven-segment array 47n is specifically provided so as to indicate the total length of tape upon which dictation is recorded. As a numerical example, if tape T normally is advanced at a speed of 1 15/16 inches per second and if signal shaping circuit 26 produces 2,048 pulses for a tape having a recording capacity of thirty minutes of dictation, then frequency divider 28 can be omitted, if desired, and counter 30 may be adapted to have the count thereof incremented to a maximum count of 2,048. If storage circuit 40 is provided with 2,048 storage locations, then the address of each storage location in which an indicating signal is stored can be used by display control circuit 42 to drive a respective seven-segment array whereby the numerical indication displayed by that seven-segment array corresponds to a respective storage location in storage circuit 40 and, therefore, corresponds to a respective length of tape along which a tone signal is recorded. In the interest of simplification, FIG. 3 is provided with ten instruction-indicating seven-segment arrays I, II, .. . X, so as to provide numerical indications of the locations along tape T at which ten tone signals are recorded. The manner in which each numerical indicator is selectively energized during a recording operation and during a scan operation is analogous to the manner in which the LED arrays (FIGS. 2A and 2B) are energized; and will be described below. If desired, different sets of numerical indicators can be provided so as to display the locations of different types of instructions.

In the embodiments shown and described with respect to FIGS. 1-3, magnetic tape cassette 12 may be used in a so-called desk-top dictation machine. Typically, such a machine is adapted to record dictation from a single user thereof. Such a desk-top dictation machine may be of the type described in U.S. Pat. No. 4,051,540. Magnetic tape cassette 12 also may be utilized in a central dictation system wherein a centrally disposed recorder is adapted to receive dictation from any one of a plurality of remote dictators. Such a central dictation system is described in U.S. Pat. No. 4,071,857, assigned to the assignee of the present invention. In such a central dictation system, a tone signal representing end of dictation generally is recorded after a particular remote dictator completes a particular piece of dictation and releases the central recorder so as to permit that recorder to communicate with another remote dictator. If tape T accumulates dictated information from a number of remote dictators, then an end-of-dictation tone signal will be recorded on the tape at the farthest advance position thereof. Hence, during a scan operation, the actuation of the scan switch need not activate tone detector 38 to simulate the detection of a tone signal. Rather, an actual end-of-dictation tone signal will be detected thereby.

A logic diagram of a portion of the apparatus shown in FIG. 1 is illustrated in FIG. 4. This logic diagram represents the manner in which counter 30 and storage circuit 40 (FIG. 1) are interrelated and are controlled. Counter 30 is shown as an UP/DOWN counter 52 having an input 52a to receive pulses supplied thereto from frequency divider 28 (FIG. 1), an UP/DN input coupled to UP/DOWN detector 32 for receiving an appropriate count up or count down command signal, a control input 52b for receiving a count down command signal, a reset input 52c to receive a RESET signal, and a preset input 52d for receiving a preset command signal so as to preset the count of UP/DOWN counter 52. Storage circuit 40 is shown as an addressable memory 50 having an address input coupled to the output of UP/DOWN counter 52 to receive an address signal therefrom, an input for receiving an indicating signal when tone generator 36 (FIG. 1) is activated, another input connected to receive another indicating signal when tone detector 38 detects the reproduction of a tone signal during a scan operation, an enable input connected to receive an ENABLE signal so as to store an indicating signal at an addressed storage location, a reset input connected to receive the aforementioned RESET signal and a shift input connected to receive shift pulses.

The control circuitry adapted to control addressable memory 50 and UP/DOWN counter 52 is comprised of a flip-flop circuit 54, an AND gate 56, another flip-flop circuit 58 and a shift pulse generator 60. Flip-flop circuit 54 is adapted to be "set" by a SCAN signal supplied to a set input thereof when a SCAN switch is actuated. It is recalled that, in preparation for a transcription operation, the SCAN switch is actuated so as to rewind tape T and sense recorded tone signals as the tape is being rewound. Flip-flop circuit 54 is adapted to be "reset" in response to an end-of-tape (EOT) signal supplied to a reset input thereof. This EOT signal is produced by conventional circuitry (not shown) after tape T has been fully rewound. As an example, this signal may be produced when the light beam emitted by LED 22 (FIG. 1) is not periodically interrupted for some predetermined period of time.

Flip-flop circuit 54 includes a Q output which is adapted to be provided with a binary "1" when the flip-flop circuit is set and with a binary "0" when the flip-flop circuit is reset. This Q output is coupled to AND gate 56 to condition this AND gate to respond to an indicating signal supplied thereto by tone detector 38. For the purpose of the present discussion, it will be assumed that an indicating signal is represented by a binary "1". Hence, AND gate 56 is supplied with a binary "1" from tone detector 38 when the tone detector detects the reproduction of a tone signal from tape T.

The SCAN and EOT signals supplied to flip-flop circuit 54 additionally are supplied to flip-flop circuit 58 so as to set and reset, respectively, this additional flip-flop circuit. An OR gate supplies the SCAN signal as well as a STOP signal (to be described) to the set input of this flip-flop circuit. Flip-flop circuit 58 additionally includes a so-called forced reset input connected to receive the aforementioned RESET signal. A $\overline{Q}$ output terminal of flip-flop circuit 58 is adapted to be provided with a binary "1" when the flip-flop circuit is reset, either in response to the EOT signal or in response to the RESET signal. The $\overline{Q}$ output terminal of flip-flop circuit 58 is connected to an enable input 60a of shift pulse generator 60 so as to supply an ENABLE signal thereto.

Shift pulse generator 60 includes a clock pulse input 60b connected to receive SHIFT CLOCK pulses which are generated by a suitable clock generator described in greater detail below. The shift pulse generator is adapted to supply the SHIFT CLOCK pulses to an output thereof when the ENABLE signal is supplied to its enable input 60a. Hence, in this regard, shift pulse generator 60 may comprise a suitable gating circuit.

The SHIFT CLOCK pulses supplied at the output of shift pulse generator 60 are applied to addressable memory 50 and to the count down input 52b of UP/DOWN counter 52. As will be explained in greater detail with respect to FIG. 4A, addressable memory 50 is responsive to each SHIFT CLOCK pulse applied thereto so as to shift the contents of all memory storage locations therein upward by one storage location. If the addressable memory is thought of as a storage stack, the contents of this stack are shifted in the upward direction in response to each SHIFT CLOCK pulse. Alternatively, if the addressable memory is thought of as an addressable register, the contents of this register are shifted from right-to-left, for example, by one register location in response to each SHIFT CLOCK pulse.

Each shift clock pulse which is applied to the count down input $52b$ UP/DOWN counter 52 is adapted to decrement the count then obtaining in the UP/DOWN counter by one. Once the UP/DOWN counter has been decremented to a predetermined count, such as a count of zero, this predetermined count is interpreted as a STOP signal and is supplied to the set input of flip-flop circuit 58. As also shown in FIG. 4, preset input $52d$ of UP/DOWN counter 52 is connected to receive the SCAN signal which is supplied thereto as the preset signal.

The operation of the apparatus shown in FIG. 4 first will be described in conjunction with a dictate operation wherein tone signals are recorded on tape T by a dictator. Let it be assumed that addressable memory 50 and UP/DOWN counter 52 initially are reset. The manner in which this reset operation is carried out will be described below. When the addressable memory is reset, the contents of each storage location therein are cleared, or reset, and the count of UP/DOWN counter 52 is reset to a count of zero. For the purpose of the present discussion, it will be assumed that addressable memory 50 stores a binary "0" in each addressable storage location therein. When tape T is advanced, for example, during the dictate operation, pulses are supplied to input $52a$ of UP/DOWN counter 52, and a count up command signal also is supplied to this counter. Hence, UP/DOWN counter 52 increments the count thereof in response to each pulse applied thereto by frequency divider 28. The instantaneous count of counter 52 is supplied as the address signal to addressable memory 50. Thus, as the count of counter 52 is incremented, successive storage locations in addressable memory 50 are addressed for storing an indicting signal therein.

Let it be assumed that, while dictation proceeds, a tone signal is recorded on tape T. Hence, an indicating signal, represented as a binary "1", is derived from tone generator 36 and supplied to addressable memory 50. This binary "1" indicating signal is stored in the particular storage location then being addressed by the count of UP/DOWN counter 52.

Figure 4A:
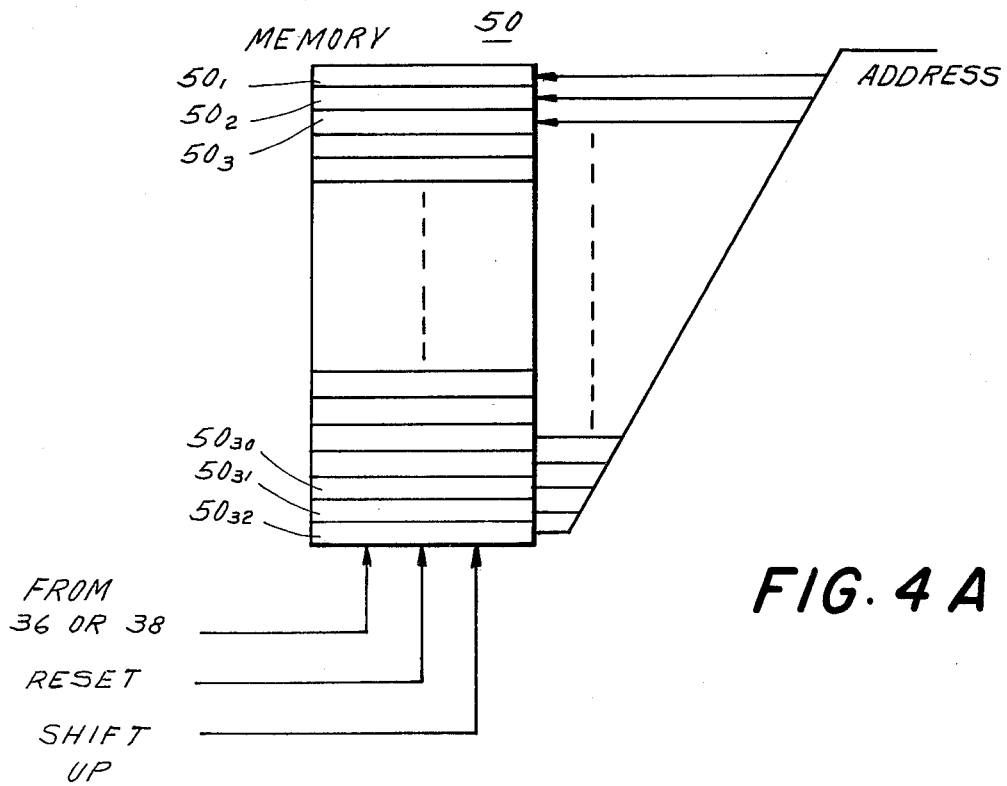
FIG. 4A represents how the memory portion of the present invention is controlled.

Addressable memory 50 is schematically illustrated in FIG. 4A as including individual storage locations $50_1$, $50_2$, . . . $50_{31}$, $50_{32}$. Consistent with the embodiment described hereinabove with respect to FIG. 1, it is assumed that each storage location in addressable memory 50 is associated with a respective LED included in display 44. For example, storage location $50_1$ is associated with the left-most LED, storage location $50_2$ is associated with the next left-most LED, . . . storage location $50_{31}$ is associated with the next-to-last LED and storage location $50_{32}$ is associated with the last, or right-most LED. Depending upon the count then existing in UP/DOWN counter 52, the associated storage location is addressed. If a binary "1" is derived from tone generator 36, this binary "1" is stored in the particular storage location then being addressed by counter 52. Thus, as dictation proceeds, and as tone signals are recorded on tape T, indicating signals corresponding to such tone signals are stored in addressed storage locations in addressable memory 50, each addressed location being associated with a respective block on tape T and also with a respective LED in display 44. The manner in which the indicating signals which are stored in selected storage locations in addressable memory 50 are used to energize the associated LED's will be described in greater detail with respect to FIGS. 5 and 6. It will suffice to recognize that the LED's thus provide an indication of the locations along tape T at which tone signals are recorded.

The manner in which the apparatus shown in FIG. 4 operates to carry out a scan operation in preparation of a transcribe operation now will be described. Let it be assumed that addressable memory 50 and UP/DOWN counter 52 are reset to their respective initial conditions. The manner in which this is achieved will be described in greater detail below. Thus, the contents of the addressable storage locations included in the addressable memory all are cleared; and the count of UP/DOWN counter 52 is reset to an initial count, for example, to the count of zero. Let it now be assumed that the scan switch is actuated so as to apply a SCAN signal to flip-flop circuits 54 and 58, thereby setting these flip-flop circuits. In addition, the SCAN signal is applied to preset input $52d$ of counter 52, thereby presetting this counter to a preset count. Consistent with the example described hereinabove, if each count of counter 52 corresponds to a respective LED included in display 44, then the count to which this counter is preset is equal to a count of 32, thus corresponding to the right-most LED.

When flip-flop circuit 54 is set, AND gate 56 is conditioned to respond to each binary "1" indicating signal applied thereto by tone detector 38. Furthermore, since flip-flop circuit 58 now is set, a binary "0" is supplied to input $60a$ of shift pulse generator 60 by the $\overline{Q}$ output of this flip-flop circuit, thereby inhibiting the shift pulse generator from responding to the SHIFT CLOCK pulses supplied thereto.

As each binary "1" indicating signal is supplied to AND gate 56, this indicating signal is stored in the particular storage location which then is addressed by UP/DOWN counter 52. The first indicating signal, which either is simulated by tone detector 38 in response to the initiation of a SCAN operation, or is produced when the end-of-dictation tone signal is reproduced by record/playback head 34 and detected by tone detector 38, is supplied to the addressable memory via conditioned AND gate 56 at the time that UP/DOWN counter 52 is preset to its preset count of 32. Hence, and in accordance with the schematic representation shown in FIG. 4A, the first indicating signal is stored in storage location $50_{32}$. As tape T is rewound, UP/DOWN detector 32 supplies a count down signal to counter 52. Hence, each pulse which is supplied to input $52a$ from frequency divider 28 serves to decrement the count of the UP/DOWN counter. Consequently, the storage locations in addressable memory 50 are progressively addressed from location $50_{32}$ to location $50_{31}$, $50_{30}$, . . . and so on. Whenever an indicating signal is produced by tone detector 38, a corresponding binary "1" is stored in the then-addressed storage location in addressable memory 50.

This scan operation is concluded when tape T is fully rewound. At that time, the EOT signal is produced so as to reset flip-flop circuits 54 and 58. When flip-flop circuit 54 is reset, the Q output thereof applies a binary "0" to AND gate 56. Hence, the AND gate now is inhibited from supplying further indicating signals to addressable memory 50.

When flip-flop circuit 58 is reset, a binary "1" is produced at the $\overline{Q}$ output thereof, thereby supplying the ENABLE signal to input 60a of shift pulse generator 60. Consequently, SHIFT CLOCK pulses which are supplied to the shift pulse generator now are transmitted therethrough to addressable memory 50 and to the count down input 52b of UP/DOWN counter 52.

It is appreciated that, when tape T has been fully rewound, counter 50 will exhibit some count associated with the amount of tape which had been rewound. That is, unless the full length of tape T is rewound, a count other than zero will be present in UP/DOWN counter 52 at the completion of the scan operation. The SHIFT CLOCK pulses which then are supplied to counter 52 serve to further decrement the count thereof in response to each such SHIFT CLOCK pulse.

As the counter of count 52 is decremented, or counted down toward zero, the contents which are stored in selective storage locations in addressable memory 50 all are shifted in the upward direction, as appears from FIG. 4A. For example, let it be assumed that indicating signals are stored in storage locations $50_{32}$, $50_{30}$, $50_{25}$, $50_{21}$ and $50_{20}$. Let it be further assumed that, at the completion of the scan operation, the count then stored in counter 52 is equal to a count of 13, that is, it is associated with storage location $50_{13}$ and with the thirteenth (viewed from left to right) LED in FIG. 2A. In response to each SHIFT CLOCK pulse produced at the output of shift pulse generator 60, the contents of addressable memory 50 are shifted upward by one storage location and the count of counter 52 is decremented. Thus, after the first SHIFT CLOCK pulse, the indicating signal previously stored in storage location $50_{32}$ now is shifted into storage location $50_{31}$, the indicating signal previously stored in location $50_{30}$ is shifted into location $50_{29}$, the indicating signal previously stored in location $50_{25}$ is shifted into location $50_{24}$, and so on. In addition, the count of counter 52 is decremented to a count of 12. In response to the next SHIFT CLOCK pulse, the indicating signal which had been stored in location $50_{32}$ and shifted into location $50_{31}$ then is shifted into location $50_{30}$. Similarly, the indicating signal which had been stored in location $50_{30}$ and had been shifted into location $50_{29}$ now is shifted into location $50_{28}$. A similar shifting operation is performed with respect to the remaining storage locations, and the count of counter 52 is further decremented from a count of 12 down to a count of 11.

The foregoing shift operation is repeated in response to each SHIFT CLOCK pulse until the thirteenth SHIFT CLOCK pulse is received. Following that pulse, the indicating signal which had been stored in the bottom-most storage location $50_{32}$ will have been shifted upward into storage location $50_{19}$. A similar upward shifting of the remaining storage locations is achieved. Also, the count of counter 52 will have been decremented from a count of 13 down to a count of zero. This zero count is supplied as a STOP signal through OR gate 55 to set flip-flop circuit 58, thereby terminating the ENABLE signal supplied to shift pulse generator 60 and disabling this shift pulse generator. Hence, further SHIFT CLOCK pulses are not applied either to addressable memory 50 or to UP/DOWN counter 52. The locations in which indicating signals are stored in the addressable memory are associated with respective LED's, and these LED's are selectively energized to provide a corresponding indication of the locations along tape T at which tone signals are recorded. Furthermore, the right-most energized LED now will be LED 19. Hence, a visual indication of the total length of dictation also is provided.

As will be explained below, the initial locations in which indicating signals are stored in addressable memory 50 during a scan operation of tape T are displayed by the LED's. Furthermore, the shifting of these initial storage locations to the final storage locations in response to the SHIFT CLOCK pulses supplied to the addressable memory also are displayed in the form of blinking, or shifting LED's. As a numerical example, the frequency of the SHIFT CLOCK pulses is 16 Hz, and thus almost a full second is required for the count of counter 52 to be decremented from 13 to a count of zero and, thus, for the indicating signals stored in addressable memory 50 to be shifted upward by 13 storage locations. Once the indicating signals are stored in their final storage locations in the addressable memory following the shift operation performed in response to the SHIFT CLOCK pulses, these indicating signals remain in such storage locations until the addressable memory 50 is reset, or cleared. Thus, for the duration of a transcribe operation, LED's associated with the respective storage locations in which indicating signals are stored are energized to provide an indication, or display, of the locations of recorded tone signals. It is appreciated that, during or prior to the actual transcription of recorded information, the transcriptionist may advance the tape to a particular location indicated by an energized LED so that the particular information, such as a special instruction, recorded at the location, can be reproduced. This facilitates the transcription of dictation with a minimum of errors and with a maximum of efficiency. Of course, as tape T is moved in the forward direction, either at a normal speed for reproducing information or at a fast-forward speed to arrive rapidly at a preselected location, the count of UP/DOWN counter 52 is incremented accordingly, such that the count thereof corresponds to the approximate present position along the length of tape T. When the tape is rewound, or backspaced to permit the transcriptionist to review information, the count of counter 52 correspondingly is decremented. Hence, and as will be explained below with respect to FIGS. 5 and 6, this instantaneous count of UP/DOWN counter 52 is utilized to control a cursor indication so as to provide a display of the present approximate position of tape which is juxtaposed a reference position, such as a record/playback head.

The manner in which a reset operation is performed now will be described. Typically, a reset operation is performed either following the completion of a transcribe operation or just prior to a scan operation. When a suitable reset switch (not shown) is actuated, the RESET signal is applied to flip-flop circuit 58 to reset this flip-flop circuit, to reset input 52c to reset UP/DOWN counter to its preset count of, for example, 32, and to preset addressable memory 50, whereby a binary "1" indicating signal is loaded into each storage location $50_1$, . . . $50_{32}$ in the addressable memory.

When flip-flop circuit 58 is reset, the binary "1" produced at its $\overline{Q}$ output is supplied as the ENABLE signal to shift pulse generator 60. Hence, SHIFT CLOCK pulses are supplied through the shift pulse generator both to addressable memory 50 and to the count down input 50b of counter 52. Accordingly, in response to each SHIFT CLOCK pulse, the contents of addressable memory 50 are shifted upward by one storage location. That is, the binary "1" stored in location $50_{32}$ is shifted upward into location $50_{31}$, the binary "1" previously stored in location $50_{31}$ is shifted into the bottom-most storage location $50_{32}$, and so on. A binary "0" is shifted into the bottom-most storage location $50_{32}$ which previously had a binary "1" stored therein. Concurrently with this shifting of indicating signals through the storage locations of addressable memory 50, the count of UP/DOWN counter 52 is decremented. Therefore, it is seen that when the count of this counter is decremented to a zero count, all of the storage locations in addressable memory 50 will store a binary "0". At that time, the zero count of counter 52 is supplied as a STOP signal to set flip-flop circuit 58 and thus disable shift pulse generator 60 from responding to further SHIFT CLOCK pulses. Accordingly, the contents of addressable memory 50 will have been cleared, and counter 52 will have been reset to an initial, zero count.

As will be explained below, even while the contents of addressable memory 50 are shifted upward therein, the indicating signals which are stored in the addressable memory are displayed by respective LED's. Hence, since this upward shifting of data through addressable memory 50 is carried out at a relatively low rate, for example, at the SHIFT CLOCK pulse rate of 16 Hz, a visible indication of shifting LED's is provided. Advantageously, this shifting effect can be relied upon as a test to determine that addressable memory 50, counter 52 and the display control circuitry, to be described, operate properly.

Although addressable memory 50 has been schematically shown in FIG. 4A as a vertical stack of storage locations, it is appreciated that the addressable memory can be implemented as an addressable shift register, or any other typical addressable memory device.

The manner in which the contents of addressable memory 50 and the count of UP/DOWN counter 52 are used to energize display 44 to display indications of the locations on tape T at which tone signals are recorded and to provide a cursor display of the present position of the tape now will be described with respect to the apparatus shown in FIG. 5. For the purpose of the present discussion, it will be assumed that the display is comprised of an array of LED's 90, and that individual ones of these LED's are energized in response to the indicating signals stored in memory 50 so as to provide indications of the locations of recorded tone signals, and in accordance with the count of counter 52 so as to provide a cursor indication of the present position of tape T with respect to a reference position. All of the storage locations $50_1, \ldots 50_{32}$ of memory 50 are scanned cyclically to detect the presence of stored indicating signals. Concurrently with the scanning of the storage locations in memory 50, the array of LED's 90 also is scanned. Hence, when a stored indicating signal is detected, the particularly LED then being scanned is energized so as to provide an indication of this stored indicating signal, and thus an indication of the location along tape T at which a tone signal is recorded. Furthermore, after all of the storage locations of memory 50 have been scanned and just prior to a repeated scanning thereof, the count of counter 52 is examined, and the one LED associated with the instantaneous count of the counter is energized as a cursor indication.

Figure 5:
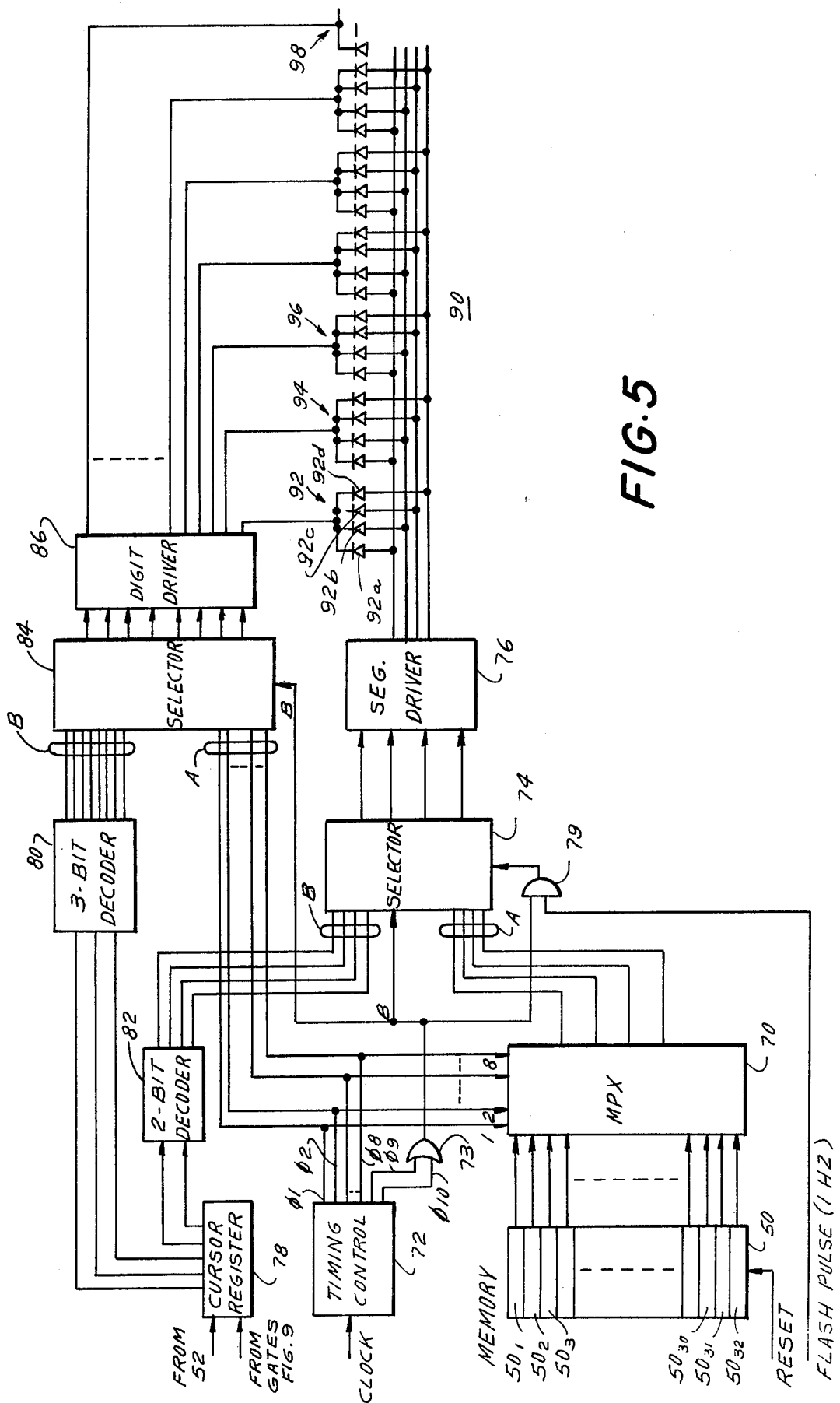
FIG. 5 is a logic diagram of one embodiment of a display and display driving apparatus which can be used with the present invention.

The apparatus used to implement the foregoing operation is shown in FIG. 5 as comprising a multiplexer 70, a timing control circuit 72, a selector circuit 74, a segment driver 76, a cursor register 78, decoders 80 and 82, and selector circuit 84 and a digit driver 86. Multiplixer 70 includes a plurality of inputs coupled to respective outputs of storage locations $50_1, \ldots 50_{32}$ of addressable memory 50. The multiplexer may be of the conventional type which includes a number of outputs, for example, four outputs. Control inputs 1, 2, . . . 7, 8 are adapted to be supplied with respective timing phase control signals $\phi_1, \phi_2, \ldots \phi_7$ and $\phi_8$ so as to select, or steer, a respective group of inputs supplied to the multiplixer by memory 50 to the outputs thereof. In accordance with the foregoing assumption, if memory 50 is provided with 32 storage locations, then multiplixer 70 likewise is provided with 32 inputs. These 32 inputs are divided into eight groups of four. Depending upon the particular timing phase control signal supplied to multiplexer 70, the corresponding group of four inputs is steered to the four outputs of this multiplexer. For example, in response to timing phase control signal $\phi_1$, the outputs of storage locations $50_1, 50_2, 50_3$ and $50_4$ are steered to the outputs of the multiplexer. If timing phase control signal $\phi_2$ is applied to multiplexer 70, then the signals stored in storage locations $50_5-50_8$ are steered to the output of the multiplexer. A similar operation is performed in response to the remaining timing phase control signals $\phi_3-\phi_8$. The outputs of multiplexer 70 are supplied to one set of inputs, for example, set A, of selector circuit 74.

The timing phase control signals $\phi_1-\phi_8$ are produced by timing control circuit 72. This circuit is described in greater detail with respect to FIG. 7, and for the present discussion, it merely need be pointed out that the timing control circuit includes a ring counter for generating each timing phase signal of predetermined duration. Timing control circuit 72 is adapted to produce additional timing phase signals $\phi_9$ and $\phi_{10}$, such that all of these timing phase signals $\phi_1-\phi_{10}$ are cyclically produced. As a numerical example, each timing phase signal has a duration of 2 msec, and the overall cycle $\phi_1-\phi_{10}$ has a duration, or period of 20 msec. In addition to being supplied to respective control inputs of multiplexer 70, timing phase signals $\phi_1-\phi_8$ are supplied to a set of inputs, for example, set A, of selector circuit 84.

Timing phase signals $\phi_9$ and $\phi_{10}$ are supplied to an OR gate 73 for producing a select control signal, this select control signal being supplied to selectors 74 and 84. Selector circuits 74 and 84 each include an additional set of inputs, shown as set B, and are adapted to provide at the outputs thereof either the input signals which are applied to input set A or the signals which are applied to input set B. Accordingly, selector circuit 74 and 84 each may be comprised of gate circuits, and more particularly, a set A and a set B of gate circuits, each set being conditioned, or enabled, in response to the select control signal produced by OR gate 73.

It may be appreciated that the select control signal is a binary "1" when either timing phase signal $\phi_9$ or timing phase signal $\phi_{10}$ is a binary "1". This select control signal is a binary "0" whenever any of phases $\phi_1-\phi_8$ is a binary "1". Selector circuits 74 and 84 are adapted to select the input signals applied to set A whenever the select control signal is a binary "0", and are adapted to select the signals applied to input set B whenever the select control signal is a binary "1". The selected signals are coupled through the respective selector circuit to the outputs thereof.

Cursor register 78 is coupled to UP/DOWN counter 52 and is adapted to receive the count exhibited by the counter. Accordingly, the cursor register may be a conventional buffer register. As will be described below, in some instances, it may be desirable to modify the actual count of counter 52 and to store this modified count in cursor register 78. For this purpose, the cursor register is provided with an additional input to receive a modified count. In the event that there is no need or desire to modify the actual count of UP/DOWN counter 52, cursor register 78 may be omitted.

In the example described above, it has been assumed that 32 LED's are provided, and that each count of counter 52 is associated with a respective one of these LED's. In conventional binary nomenclature, a count of 32 is represented by 5 bits. The 3 most significant bits of the count stored in cursor register 78 are supplied to decoder 80 and the remaining two least significant bits of the count are supplied to decoder 82. Decoder 80 is a so-called 3-bit decoder which includes eight individual outputs for supplying an output signal to an individual one of these outputs corresponding to the three bits supplied thereto by cursor register 78. These eight outputs are supplied to input set B of selector circuit 84.

Similarly, decoder 82 is a so-called two-bit decoder which is provided with four individual outputs. Decoder 82 provides an output signal at an individual one of these outputs corresponding to the two bits supplied thereto by cursor register 78. These four outputs from decoder 82 are applied to input set B of selector circuit 74.

Array of diodes 90 is arranged in groups each containing four diodes. For example, group 92 is constituted by diodes 92a, 92b, 92c and 92d. Additional, similarly constituted groups are formed as groups 94, 96, 98, ... Assuming that thirty-two diodes are used, array of diodes 90 is formed of eight groups, each group consisting of four diodes. Selector circuit 84 is adpated to select an individual one group to be energized, and selector circuit 74 is adapted to select for energization particular ones of the LED's included in the selected group. Each group may be thought of as a digit, and each LED included in a group may be thought of as a segment. Accordingly, digit driver 86 is coupled to the output of selector circuit 84 and is adapted to selectively energize the particular digit, or group, which has been selected by selector circuit 84. As shown, digit driver 86 includes a number of outputs, for example, eight outputs, each output being connected to the common-connected cathodes in a group of LED's. Thus, depending upon the selected group, digit driver 86 supplies a relatively low voltage, such as ground potential, to the common-connected cathodes of a respective group of LED's. Segment driver 76 is coupled to the outputs of selector circuit 74 and the outputs of the segment driver are connected in common to respective anodes of individual diodes in each group. Thus, a particular LED is energized as a function of the group to which a low voltage is supplied by digit driver 86 and the particular LED in that group whose anode is supplied with a relatively higher driving potential by segment driver 76.

It is recalled that a cursor indication is provided by flashing a particular LED at a relatively low repetition rate. In this regard, a FLASH pulse is generated, as will be described with respect to FIG. 7, and this FLASH pulse is used to alternately inhibit and enable the outputs of selector circuit 74 whenever the selector circuit is responsive to the cursor signals applied to input set B thereof. This is achieved by an AND gate 79 which includes one input connected to receive the FLASH pulse and another input connected to receive the select control signal produced by OR gate 73. The output of AND gate 79 is connected to an enable input of selector circuit 74. Thus, this selector circuit is alternately enabled and disabled only during the times that the signals applied to input set B thereof are selected.

The operation of the display control circuitry shown in FIG. 5 now will be described. This circuitry operates in the same manner regardless of whether memory 50 is being loaded with indicating signals, or whether the indicating signals stored therein are being shifted from one storage location to another, or whether dictation is being recorded onto tape T or being transcribed therefrom, or whether the tape is being moved in a forward or reverse direction at a normal or at a fast speed. Timing phase signals $\phi_1$-$\phi_{10}$ are generated sequentially by timing control circuit 72. For the interval that timing phase signals $\phi_1$-$\phi_8$ are generated, the select control signal operates selector circuits 74 and 84 to transmit the signals applied to input set A thereof to the outputs of these selector circuits. Thus, at timing phase signal $\phi_1$, multiplexer 70 is actuated so as to supply the contents of that group of storage locations of memory 50 which are associated with timing phase $\phi_1$ to selector circuit 74. That is, the contents of storage locations $50_1$-$50_4$ are supplied through multiplexer 70 to input set A of selector circuit 74, and thence to segment driver 76. At the same time, timing phase signal $\phi_1$ is supplied through selector circuit 84 to digit driver 86. Thus, digit driver 86 enables group 92 of LED's, and those LED's in group 92 which are associated with storage locations in memory 50 in which indicating signals are stored are energized. For example, if an indicating signal is stored in storage location $50_1$, then in response to timing phase signal $\phi_1$, LED 92a is energized. Depending upon the storage locations $50_1$-$50_4$ in which indicating signals are stored, corresponding LED's 92a-92d are energized.

At the next timing phase signal $\phi_2$, multiplexer 70 is activated to supply the contents of storage locations $50_5$-$50_8$ to selector circuit 74. At the same time, timing phase signal $\phi_2$ is supplied through selector circuit 84 to digit driver 86, whereby group 94 is energized. That is, those LED's in group 94 which are associated with storage locations $50_5$-$50_8$ in which indicating signals are stored are driven by selector circuit 74 and segment driver 76.

Similar operations are achieved in response to succeeding timing phase signals $\phi_3$-$\phi_8$. Thus, after timing phase signal $\phi_8$ is produced, all of LED's 90 will have been scanned and selectively energized in accordance with the contents of memory 50.

At the occurrence of timing phase signal $\phi_9$, OR circuit 73 produces a binary "1" select control signal, whereby selector circuits 74 and 84 each respond to the signals applied to input set B thereof. Selector circuit 84 is supplied with a decoded representation of the three most significant bits of the count stored in cursor register 78. Accordingly, digit driver 86 supplied an energizing signal to the one group of LED's which is identified by the decoded three most significant bits. In the meantime, the two least significant bits are decoded by decoder circuit 82, and selector circuit 74 energizes segment driver 76 in accordance with these decoded bits. Consequently, the segment driver drives a respective one LED which is identified by these decoded bits.

Therefore, the one LED which is determined by the one group which is energized by digit driver 86 and the one LED therein which is energized by segment driver 76 is driven. Furthermore, in accordance with the alternate enabling and disabling of selector circuit 74 by the FLASH pulse supplied thereto through AND gate 79, this one energized LED is flashed at the 1 Hz flash rate so as to provide a cursor indication of the count then stored in cursor register 78.

At the next timing phase signal $\phi_{10}$, selector circuits 74 and 84 again are energized so as to respond to the signals applied to input set B thereof. Thus, the one LED associated with the count stored in cursor register 78 again is energized.

After timing phase signal $\phi_{10}$ is produced, the sequence of timing phase signals is repeated. Thus, the storage locations $50_1$–$50_{32}$ in memory 50 are scanned concurrently with the scanning of groups 94, 96, ... 98 of array of LED's 90. Those LED's in a scanned group which are associated with storage locations in which indicating signals are stored are energized, as described above. Also, during timing phases $\phi_9$ and $\phi_{10}$, the LED corresponding to the count then stored in cursor register 78 is energzied to provide a cursor indication of the present position of tape T with respect to a reference position. In accordance with one numeral example, the duration of each timing phase signal is 2 msec. Hence a complete cycle ($\phi_1$–$\phi_{10}$) is completed in a 20 msec period. The repetition rate at which any one LED 90 is energized is 50 Hz. This rate is sufficiently fast so as to avoid visual flicker. Thus, to an observer of the LED's, it would appear that selected ones are constantly energized, corresponding to the locations along tape T at which tone signals are recorded, and a cursor LED, flashing at a 1 Hz rate, represents the present position. As may be expected, the very same LED which is energized to provide an indication of the location of a tone signal also may be energized to provide a cursor indication. In that event, the cursor LED will flash between a bright state and a very bright state.

As may be appreciated, various other circuit arrangements can be used to drive the LED's in accordance with the contents of memory 50 and in accordance with the contents of cursor register 78. For example, selector circuit 74 and segment driver 76 may be provided with a greater or lesser number of outputs, if desired. Similarly, selector circuit 84 and digit driver 86 also may be provided with a greater or lesser number of outputs. In addition, the illustrated groups of LED's may actually be subgroups, and yet another selector circuit and digit driver may be needed to select a group in which a selected subgroup and segment are driven. Still further, a greater or lesser number of timing phase signals may be used. It also is appreciated that, if desired, only timing phase signal $\phi_9$ (or $\phi_{10}$) may be needed to energize a particular LED for providing the cursor indication. In that event, an extra timing phase signal may be present, and the phase allotted to this extra timing phase signal may be used for other operations, as may be needed.

In the event that different arrays of LED's 90 are used to provide indications of different instructions, a common digit driver 86 may be used to energize sequentially each group of LED's in both arrays. A single selector circuit 74 also may be used, but respective segment drivers 76 may be provided for each array. If the type of instruction is represented by an encoded indicating signal stored in memory 50, then a decoding circuit may be provided at the output of selector circuit 74 so as to energize a particular segment driver associated with the array which corresponds to the encoded indicating signal which is read out of memory 50. Thus, depending upon the type of instruction, a particular LED in a respective one of arrays 90 will be energized to provide an indication of the location along tape T at which that instruction is recorded.

Another embodiment of a display control circuit is illustrated in FIG. 6. Like reference numerals are used to identify the same components which have been discussed previously with respect to FIG. 5. Thus, FIG. 6 illustrates timing control circuit 72 for generating timing phase signals $\phi_1$–$\phi_{10}$, cursor register 78 and, of course, memory 50. In FIG. 6, LED's 200 are identified as LED's 201–232, the anodes of these LED's being connected in common to a source of operating potential +V. The cathodes of LED's 201–232 are connected to the outputs of NAND gates 101–132, respectively. Each of these NAND gates includes an input coupled to a respective storage location $50_1$–$50_{32}$ of memory 50, and another input connected to receive a respective one of timing phase signals $\phi_1$–$\phi_8$. In particular, the NAND gates are divided into groups of four, with each group of four being supplied with one of the timing phase signals. Thus, NAND gates 101–104 are connected in common to the $\phi_1$ output of control circuit 72 for respective timing phase signal $\phi_1$. Similar groups of NAND gates are connected in an analogous manner.

The output of cursor register 78 is connected to a decoder circuit 140. This decoder circuit is responsive to the 5-bit count stored in the cursor register to supply an energizing signal to a particular output 141–172 of the decoder, this output corresponding to the count stored in the cursor register. The energizing signal is a relatively low voltage, such as ground potential. Outputs 141–172 of decoder 140 are connected to the cathodes of LED's 201–232, respectively. Thus, depending upon which output of decoder 140 is supplied with an energizing signal, a corresponding one of LED's 200 is energized. The decoder additionally is supplied with an ENABLE signal produced by OR gate 73 and corresponding to the aforedescribed select control signal. Still further, a FLASH pulse whose frequency is 1 Hz also is supplied to decoder 140.

In operation, it is recognized that timing phase signals $\phi_1$–$\phi_8$ sequentially scan groups of NAND gates, such as the group constituted by NAND gates 101–104, then the next group of NAND gates, and so on. When a group of NAND gates is conditioned, as by a binary "1" supplied thereto by timing control circuit 72, the respective outputs of these respective conditioned NAND gates is determined by the presence or absence of an indicating signal stored in the storage location in memory 50 which is connected to such NAND gates. For example, if a binary "1" indicating signal is stored only in storage location $50_2$, then when NAND gates 101–104 are conditioned by timing phase signal $\phi_1$, only NAND gate 102 will respond to the binary "1" indicating signal supplied thereto so as to apply a binary "0" to the cathode of LED 202. This, in turn, results in the energization of this LED, thereby indicating the location of a tone signal which is recorded on tape T. If the remaining storage locations $50_1$, $50_3$ and $50_4$ are not provided with indicating signals, then the content of each of these remaining storage locations is a binary "0". Conditioned NAND gates 101, 103 and 104 respond to the binary "0" supplied thereto to produce a binary "1", thereby preventing associated LED's 201, 203 and 204 from being energized.

The next group of NAND gates is conditioned by timing phase signal $\phi_2$, and respective ones of the LED's connected to these NAND gates are energized if indicating signals are stored in the associated storage locations in memory 50. Thus, as timing phase signals $\phi_1$–$\phi_8$ are sequentially produced, groups of storage locations in memory 50 are scanned concurrently with the scanning of groups of LED's. Respective LED's in a scanned group are energized in accordance with indicating signals which are stored in a simultaneously scanned group of storage locations.

When timing phase signals $\phi_9$ and $\phi_{10}$ are produced, OR gate 73 supplies an ENABLE signal to decoder 140. Hence, the 5-bit count stored in cursor register 78 is decoded by the decoder to provide an energizing signal at the one output 141–172 thereof which corresponds to the count in the cursor register. This energizing signal is supplied to a corresponding cathode of a particular LED such that this LED is energized. Hence, during the scanning cycle established by timing control circuit 72, the count stored in cursor register 78 is decoded and a corresponding LED is flashed, in accordance with the FLASH pulse supplied to decoder 140, to provide a cursor indication of the present position of tape T. It is appreciated that the apparatus shown in FIG. 6 functions in substantially the same manner as the apparatus shown in FIG. 5 such that LED's 200 are selectively energized to provide both an indication of the location of a recorded tone signal and a cursor indication of the present position of tape T relative to a reference position.

As an example of construction, decoder 140 may comprise suitable gating circuitry including an enable input for receiving the ENABLE signal produced by OR gate 73, and another input connected to receive the FLASH pulse, whereby the gate circuitry is alternately enabled and disabled by this FLASH pulse.

Turning now to FIG. 7, a more detailed illustration of timing control circuit 72 is illustrated. This timing control circuit includes a clock generator 180, a series of dividers 182, 184 and 186 and a ring counter 188. Clock generator 180 comprises a conventional, stable oscillator which generates a train of relatively high frequency clock pulses. The output of the clock generator is connected to divider 182, which may comprise a typical pulse frequency divider adapted to divide the frequency of the clock pulses supplied thereto to a lower, predetermined frequency. As a numerical example, the frequency of the pulses produced by divider 182 is equal to 500 Hz. These divided clock pulses of reduced frequency are supplied to further divider 184 and, in addition, to ring counter 188.

Divider 184 also may comprise a typical pulse frequency divider circuit for dividing the frequency of the 500 Hz pulses down to a predetermined frequency of, for example, 16 Hz. It is appreciated that the pulse signals produced by divider 184 constitute the SHIFT CLOCK pulses which are supplied to shift pulse generator 60 of FIG. 4. These SHIFT CLOCK pulses are further divided by divider 186, resulting in output pulses of a frequency equal to 1 Hz. Hence, and as is appreciated, divider 186 may comprise a four-stage binary divider, the output of the last stage constituting the 1 Hz pulses. These low frequency pulses constitute the FLASH pulses which are applied to AND gate 79 in FIG. 5 and to decoder 140 in FIG. 6. It is recalled that these FLASH pulses are used in conjunction with the cursor indication.

Ring counter 188 is a typical closed loop shift register capable of sequentially shifting the contents of a first stage through successive stages, with the last stage of the register being coupled to the first stage so as to recycle this sequential shifting process. Accordingly, ring counter 188 may include ten stages connected in a ring configuration and adapted to produce timing phase signals $\phi_1$–$\phi_{10}$ sequentially. In this regard, a binary "1" is shifted from one stage to an adjacent stage in response to each pulse supplied to the ring counter by divider 182.

A waveform representation of timing phase signals $\phi_1$–$\phi_{10}$ is illustrated in FIGS. 8A–8J, respectively. If a binary "1" is shifted into the first stage of ring counter 188, timing phase signal $\phi_1$ is produced (FIG. 8A). This timing phase signal terminates at the next pulse supplied to the ring counter by divider 182, whereupon the next timing phase signal $\phi_2$ is produced. Successive pulses supplied to ring counter 188 produce successive timing phase signals $\phi_3$, $\phi_4$, ... $\phi_{10}$, in sequence. It is seen that the duration of each timing phase signal is equal to the period of the pulses supplied to the ring counter by divider 182. The overall "cycle" time, or duration, is equal to the time required for ten pulses to be supplied to the ring counter.

As is appreciated, the dividing ratios of the respective dividers 182, 184 and 186 may be selected as desired, and dependent upon the frequency of the clock pulses produced by clock generator 180, and further dependent upon the desired output frequency of the SHIFT CLOCK pulses and the FLASH pulse. Furthermore, dividers 182, 184 and 186 may be formed as a single integrated circuit with respective output taps whereat the individual pulses are derived. Still further, ring counter 188 may be formed of a number of individual stages corresponding to the number of timing phase signals which is desired. Hence, it is contemplated that either less or more than ten stages can be used if a corresponding number of timing signals is to be provided.

If the display used with the present invention is constituted by one or more arrays of LED's, such as shown in FIGS. 2, 5 and 6, it is appreciated that each LED is associated with a block of tape having finite length. For example, in a tape having a recording capacity of thirty minutes and driven at a recording speed of 1 15/16 inches per second, then each LED is associated with a block whose length is 109 inches, and having a recording capacity of 56¼ seconds. Hence, when the LED is energized, it indicates that a tone signal is recorded at some location in this 109 inch block. This means that the tone signal can be recorded at the very beginning or very end of this block, and thus very close to an adjacent block. If a tone signal is recorded at the very beginning or very end of a block, hereinafter the "fringe" area, the possibility of tape stretching or slippage may result in an error whereby the tone signal in the fringe area of one block is detected as being in the fringe area of the next adjacent block. This error may appear as an improper cursor indication. For example, let it be assumed that a tone signal is recorded in the right-most fringe area of block #26, that is, the block associated with the twenty-sixth LED. In accordance with the aforedescribed scan operation, LED 26 will be energized. However, because of tape stretching, the tone signal which is recorded in the right-most fringe area of block #26 now may be detected as being recorded in the left-most fringe area of the next higher block, or block number 27. If the tape is advanced rapidly to the recorded tone signal, the cursor indication representing present position will be advanced to block number 27 because of this tape stretching. Thus, the display will indicate that a tone signal is recorded in block number 26, but the cursor will represent that the tape has been advanced to block number 27. Although there has been no change or shift in the actual position on tape T at which the tone signal is recorded, nevertheless, this tape stretching will produce an erroneous display of the location of a tone signal and the present position of the tape.

Figure 9:
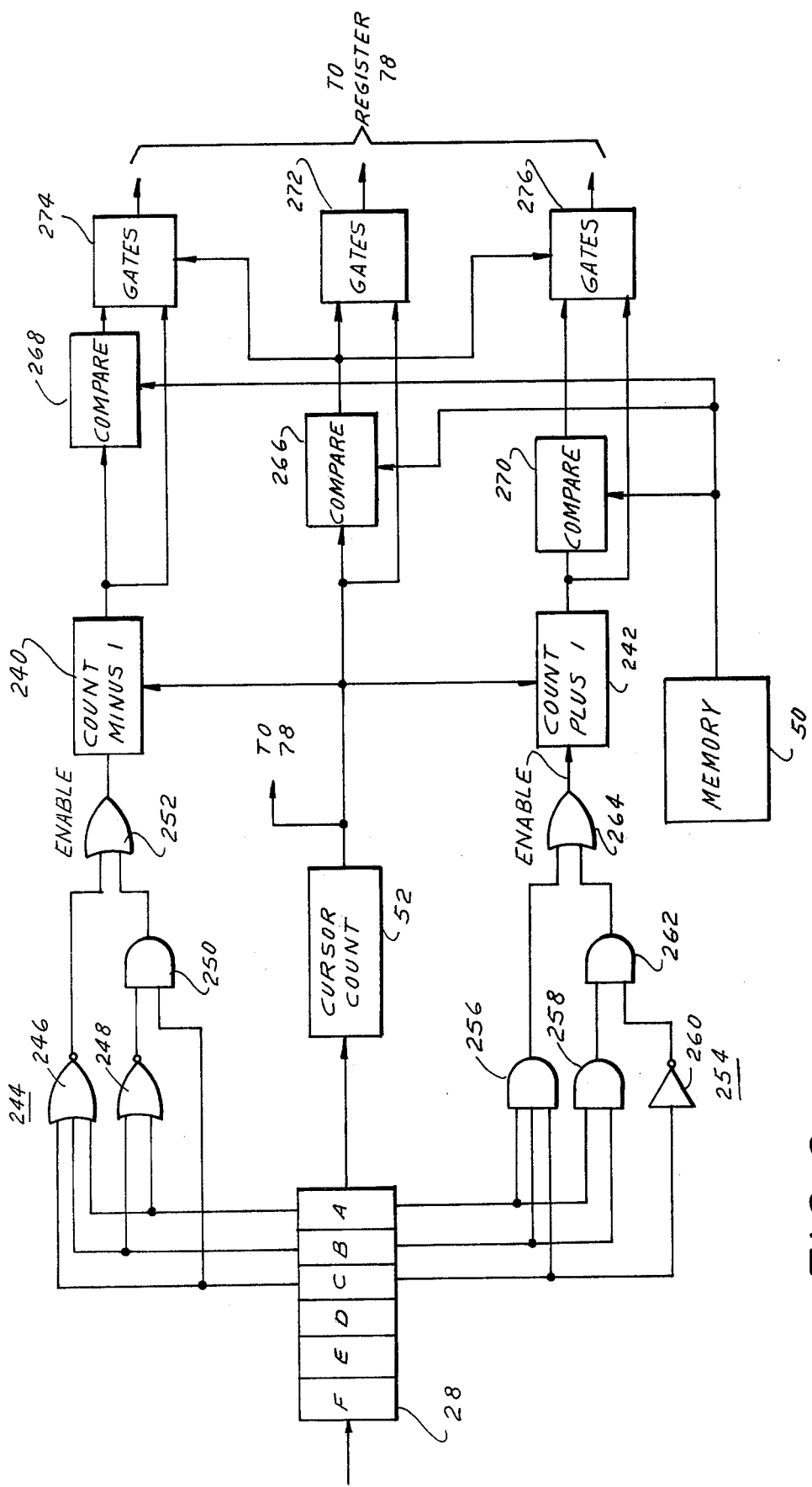
FIG. 9 is a logic diagram of an advantageous adaptive feature of the present invention.

The foregoing possibility of producing an erroneous display is avoided by the apparatus shown in FIG. 9. This apparatus is adapted to detect when the actual position of tape T with respect to, for example, the record/playback head, is within one of the fringe areas of a block. If the actual position of the tape is within such a fringe area, and if an indicating signal is stored in the storage location of memory 50 associated with the adjacent block, then the present position of the tape, as represented by the count stored in cursor register 78, is modified so as to correspond to that adjacent block. This function is represented diagramatically in FIGS. 10A–10E. In each of these figures, tape T is represented as a series of successive blocks, for example, blocks 25, 26, 27, and 28, each block having a left fringe area and a right fringe area. The legend "cursor register" represents the count then stored in cursor register 78 (FIGS. 5 and 6) and corresponds to the block of tape which then is juxtaposed the record/playback head. The legend "actual position" represents the actual position of the tape which is juxtaposed the record/playback head. A circle within a block represents the storage location in memory 50 which is associated with that block, and thus with a corresponding LED, and a dark circle represents that an indicating signal is stored in that storage location, while a blank circle represents that no indicating signal is stored in that storage location.

In view of the foregoing convention, FIG. 10A depicts that cursor register 78 is provided with a count of 26 when the actual present position of the tape is somewhere within corresponding block number 26. In FIG. 10B, if the actual position of the tape is within the right fringe area of block number 26, and if an indicating signal is stored in storage location number 26 of memory 50, then the cursor register stores a count of 26, indicating that the actual position of the tape is equal to that position at which a tone signal is recorded. FIG. 10C indicates that if the actual position of the tape is at the right fringe area of block number 26, but that neither block number 26 nor block number 27 has a tone signal recorded therein, that is, the storage locations in memory 50 associated with these blocks are not provided with indicating signals, then a count of 26 is stored in cursor register 78, even though the tape is positioned at the right fringe area of this block. However, if the tape is positioned at the right fringe area of block 26, but if the storage location in memory 50 associated with adjacent block number 27 has an indicating signal stored therein, FIG. 10D represents that the count stored in cursor register 78 is modified from a count of 26 to a count of 27. That is, when LED 27 is energized to provide an indication that a tone signal is recorded in block number 27, then once the tape is moved to the right fringe area of block number 26, the count of cursor register 78 is modified to correspond to the next adjacent block, even though the actual position of the tape has not reached that next adjacent block. FIG. 10E represents a similar operation in the event that the actual position of the tape is in the left fringe area of block number 26 but that an indicating signal is stored in the storage location of memory 50 which is associated with the next adjacent block number 25. That is, as shown in FIG. 10E, even though the tape has not reached block number 25, the count stored in the cursor register is modified so as to be equal to block number 25, thus providing an indication that the present position of the tape corresponds to the position whereat a tone signal is recorded. Of course, in FIGS. 10D and 10E, if an indicating signal is stored in the storage location of memory 50 which is associated with block number 26, then even if the actual position of the tape is in the left or right fringe area of block number 26, the count stored in cursor register 78 will remain as count number 26, as shown in FIG. 10B. The modification to the count stored in the cursor register, as represented by FIGS. 10D and 10E, depends upon the presence of an indicating signal in a storage location associated with an adjacent block, the absence of an indicating signal in the storage location associated with the actual block and the present position of the tape disposed in the left or right fringe area of the actual block.

Turning now to the apparatus shown in FIG. 9, like reference numerals are used to identify those elements which have been shown and described previously. The illustrated apparatus includes a subtracting circuit 240, an adding circuit 242, a left fringe detector 244, a right fringe detector 254, comparators 266, 268 and 270 and gate circuits 272, 274 and 276. Subtracting circuit 240 is adapted to subtract a count of one from the count then present in counter 52 (shown in FIG. 4 and reproduced in FIG. 9) in the event that the present position of the tape is located in the left fringe area of the block identified by the count then present in counter 52. Accordingly, left fringe detector 244 is coupled to an enable input of subtracting circuit 240 to supply an ENABLE signal thereto, whereby the count present in counter 52, which also is supplied to the subtracting circuit, is reduced by a count of one.

Adding circuit 242 is connected to receive the count of counter 52 and to increase the count of that counter by a count of one in the event that the present position of the tape is in the right fringe area of the block associated with the count of counter 52. Accordingly, right fringe detector 254 is coupled to an enable input of adding circuit 242 and is adapted to supply an ENABLE signal thereto when the right fringe area of a block is detected.

The output of counter 52, in addition to being supplied to cursor register 78 (FIGS. 5 and 6) also is supplied to comparator 266. This comparator is adapted to compare the contents of a corresponding storage location to determine whether an indicating signal is stored in that storage location. The output of comparator 266 is connected to a conditioning input of gate circuit 272 and, in addition, to an inhibit input of each of gate circuits 274 and 276. The output of counter 52 also is connected to gate circuit 272. In the event that comparator 266 senses an indicating signal in the storage location corresponding to the count then present in counter 52, it conditions gate circuit 272 to gate the count of counter 52 and also inhibits gate circuits 274 and 276 from operating. The output of gate circuit 272 is connected to cursor register 78 to indicate that the count of counter 52 is supplied to the cursor register in the event of a comparison by comparator 266.

Comparator 268 is similar to comparator 266 and is adapted to detect an indicating signal in the storage location in memory 50 corresponding to the count produced by subtracting circuit 240. The output of comparator 268 is connected to a conditioning input of gate circuit 274, and the output of subtracting circuit 240 is further connected to this gate circuit. In the event that comparator 268 detects an indicating signal in the storage location of memory 50 which corresponds to the count provided by subtracting circuit 240, gate circuit 274 is conditioned to transmit the count of subtracting circuit 240 to cursor register 278. This represents that the count stored in the cursor register may be modified, or reduced by a count of one, in the event of a comparison by comparator 268. Of course, gate circuit 274 is inhibited in the event that comparator 266 supplies an inhibit signal thereto.

Comparator 270 is similar to comparator 266 and is adapted to detect an indicating signal in the storage location of memory 50 which corresponds to the count provided by adding circuit 242. The output of comparator 270 is connected to a conditioning input of gate circuit 276, and the output of adding circuit 242 is further connected to this gate circuit. In the event that a comparison is provided by comparator 270, gate circuit 276 is conditioned to gate the count of adding circuit 242 to cursor register 78. This represents that the count stored in the cursor register may be modified, or increased by a count of one, in the event of a comparison by comparator 270. Of course, gate circuit 276 is inhibited from gating the count of adding circuit 242 to cursor register 78 in the event that comparator 266 supplies an inhibit signal thereto.

As shown in FIG. 1, frequency divider 28 divides the frequency of the pulses supplied thereto by shaping circuit 26 to apply such frequency-divided pulses to counter 30. In FIG. 9, frequency divider 28 is shown as a six-stage divider for dividing the 2,048 pulses, which are produced for a length of tape capable of recording thirty minutes of dictation, down to thirty-two pulses. Each of stages A–F performs a divide-by-two function, and the most significant stage A has its output connected to counter 52. As may be appreciated, a pulse is supplied to counter 52 when the contents of stages A, B and C change from 111 to 000. Successive ones of these pulses are counted by counter 52 and, in accordance with the foregoing example, each such pulse represents an increment of about 109 inches having a recording capacity of 56¼ seconds.

Since the transition of a count of 111 in stages A, B and C to a count of 000 represents the start of a block, it is assumed that a count of 000 and a count of 001 are produced when the left fringe area of that block is juxtaposed the record/playback head. Furthermore, it is assumed that a count of 110 and a count of 111 are produced by stages A, B and C when the right fringe area of that block is juxtaposed the record/playback head.

In accordance, with the foregoing, left fringe detector 244 is comprised of NOR gates 246 and 248, AND gate 250 and OR gate 252 for the purpose of detecting when the contents of stages A, B and C of frequency divider 28 are equal to 000 or 001. Similarly, right fringe detector 254 is comprised of AND gates 256 and 258, inverter 260, AND gate 262 and OR gate 264 for detecting when the contents of stages A, B and C are equal to a count of 110 or 111. In this regard, NOR gate 246 is a 3-input NOR gate connected to the outputs of stages A, B and C, respectively. As is recognized, when the contents of these stages are equal to 000, NOR gate 246 supplies a binary "1" which, in turn, is transmitted by OR gate 252 as the ENABLE signal to subtracting circuit 240. When the count of stages A, B and C is incremented to a count of 001, NOR gate 248, which is a two-input NOR gate connected to stages A and B, respectively, detects a binary "0" in each of these stages, to supply a binary "1" to AND gate 250. This AND gate is a two-input AND gate whose remaining input is connected to stage C to receive the binary "1" therefrom. Hence, the combination of NOR gate 248 and AND gate 250 detects the presence of a count of 001 in stages A, B and C to supply a binary "1" to OR gate 252 which, in turn, applies the ENABLE signal to subtracting circuit 240.

AND gate 256 included in right fringe detector 254 is a 3-input AND gate connected to stages A, B and C, respectively, for detecting a binary "1" in each stage. Hence, when the count of stages A, B and C is equal to 111, AND gate 256 supplies a binary "1" to OR gate 264 which, in turn, applies the ENABLE signal to adding circuit 242. The count of 110 in stages A, B and C is detected by AND gate 258, which is a 2-input AND gate connected to stages A and B, respectively, and inverter 260 which is connected to stage C. Thus, when the count of 110 is present in stages A, B and C, a binary "1" is supplied to AND gate 262 by AND gate 258, and the binary "0" in stage C is inverted by inverter 260 and supplied as a binary "1" to the remaining input of AND gate 262. Consequently, at the count of 110 in stages A, B and C, AND gate 262 supplies a binary "1" to OR gate 264 which, in turn, applies the ENABLE signal to adding circuit 242.

It may be appreciated that, if desired, the respective left and right fringe detectors 244 and 254 each may have a finer resolution than described above. For example, these fringe detectors may be connected to stages A, B, C and D of frequency divider 28. In that event, the left fringe detector may be connected so as to detect counts of 0000, 0001 and 0010. Similarly, right fringe detector 254 may be connected so as to detected counts of 1111, 1110, and 1101. As is recognized, other counts representing left and right fringes, respectively, may be detected by detectors 244 and 254.

The operation of the apparatus shown in FIG. 9 is best understood when described in conjunction with FIGS. 10A–10E. Let it be assumed that the condition shown in FIG. 10B is present. Thus, counter 52 is provided with a count of 26. Furthermore, the actual position of tape T is at the right fringe of block 26. Hence, stages A, B and C of frequency divider 28 may exhibit a count of 111 or 110. It is further assumed that storage location number 26, the storage location in memory 50 which is associated with the count then present in counter 52, has an indicating signal stored therein. Accordingly, right fringe detector 254 detects that tape T has been advanced to the right fringe area of block number 26. Consequently, the ENABLE signal is supplied to adding circuit 242, whereby the count of 26, then present in counter 52, is incremented by 1 to a count of 27. Also, comparator 266 senses the presence of the indicating signal in storage location number 26. Thus, comparator 266 supplies an inhibit signal to gate circuits 274 and 276, thereby inhibiting these gate circuits regardless of the operations of comparators 268 and 270. At the same time, the comparison produced by comparators 266 conditions gate circuit 272 to gate the count of 26, then present in counter 52, to cursor register 78. Of course, this count of 26 had been stored in the cursor register at the time that counter 52 had been incremented thereto, and thus, the contents of the cursor register are not disturbed.

Let it now be assumed that the condition shown in FIG. 10C is present. Right fringe detector 254 detects the count of 111 or 110 in stages A, B and C, whereby adding circuit 242 is enabled. Thus, the count of 26, then present in counter 252, is incremented by 1, and this incremented count of 27 is compared to the contents of storage location number 27 in member 50. As shown in FIG. 10C, an indicating signal is not present in the storage location number 27. Hence, comparator 270 does not condition gate circuit 276. Also, and as shown in FIG. 10C, storage location number 26 in memory 50 is not provided with an indicating signal. Hence, comparator 266, which compares the contents of this storage location in response to the count of 26 supplied thereto by counter 52, also does not condition gate circuit 272. Thus, since none of gate circuits 272, 274 and 276 is conditioned, the contents of cursor register 78, which is here equal to a count of 26, are not disturbed.

With the condition shown in FIG. 10D, storage location number 26 in memory 50 is not provided with an indicating signal, but storage location number 27 is. When block number 26 is reached, the count of counter 52 corresponds to a count of 26, and this count is stored in cursor register 78. Now, when the tape has advanced into the right fringe area of block number 26, the count of 111 or 110 in stages A, B, C of frequency divider 28 is detected by right fringe detector 254, thereby enabling adding circuit 242 to increment the count of 26, supplied by counter 52, by 1. This increment count of 27 is compared in comparator 270 to the contents of storage location number 27 in memory 50. Since an indicating signal is stored in storage location number 27, comparator 270 conditions gate circuit 276. At this time, comparator 266 does not inhibit gate circuit 276 because storage location number 26, the storage location corresponding to the count then present in counter 52, does not contain an indicating signal. Therefore, gate circuit 276 is activated to supply the incremented count of 27 from adding circuit 242 to cursor register 78. The contents of the cursor register are, therefore, modified such that, even though the tape still is within block number 26, the cursor appears at LED number 27. This accounts for the aforementioned tape stretching or slippage problem, and the cursor is indicated as being at the very location of the tape on which a tone signal had been recorded. That is, even though the actual position of the cursor should be indicated by LED number 26, this position is shifted by 1 because the right fringe area of block number 26 is juxtaposed the record/playback head and LED number 27 provides an instruction indication.

Referring to the condition shown in FIG. 10E, let it be assumed that the tape is backspaced through block number 26. Hence, the count in counter 52 is equal to a count of 26, and this count is stored in cursor register 78. When the tape is further backspaced into the left fringe area of block number 26, left fringe detector 244 detects the count of 000 or 001 in stages A, B and C, thereby supplying the ENABLE signal to subtracting circuit 240. Hence, the count of 26 in counter 52 is decremented by 1 to a count of 25. This decremented count of 25 is compared in comparator 268 to the contents of storage location number 25 in memory 50. As shown in FIG. 10E, an indicating signal is present in storage location number 25, whereby comparator 268 conditions gate circuit 274. At this time, since no indicating signal is stored in storage location number 26, comparator 266 does not inhibit gate circuit 274. Therefore, gate circuit 274 is activated to supply the decremented count of 25 to cursor register 78. Thus, the contents of the cursor register are modified so as to represent that the approximate present position of the tape is at the location at which a tone signal is recorded.

Therefore, in accordance with the apparatus shown in FIG. 9, erroneous indications due to tape stretching or slippage are avoided. That is, if an LED is energized to indicate the location of a recorded tone signal, the tape can be rapidly advanced to that tone signal without the possibility that the cursor, which indicates the approximate present position of the tape, flashes an adjacent LED. Rather, the cursor position is shifted so as to indicate that the tape has been properly advanced to the recorded tone signal. The implementation of the apparatus shown in FIG. 9 may differ from the illustrated block diagram; but it is recognized that the function of such implementation will be described hereinabove.

Figure 11:
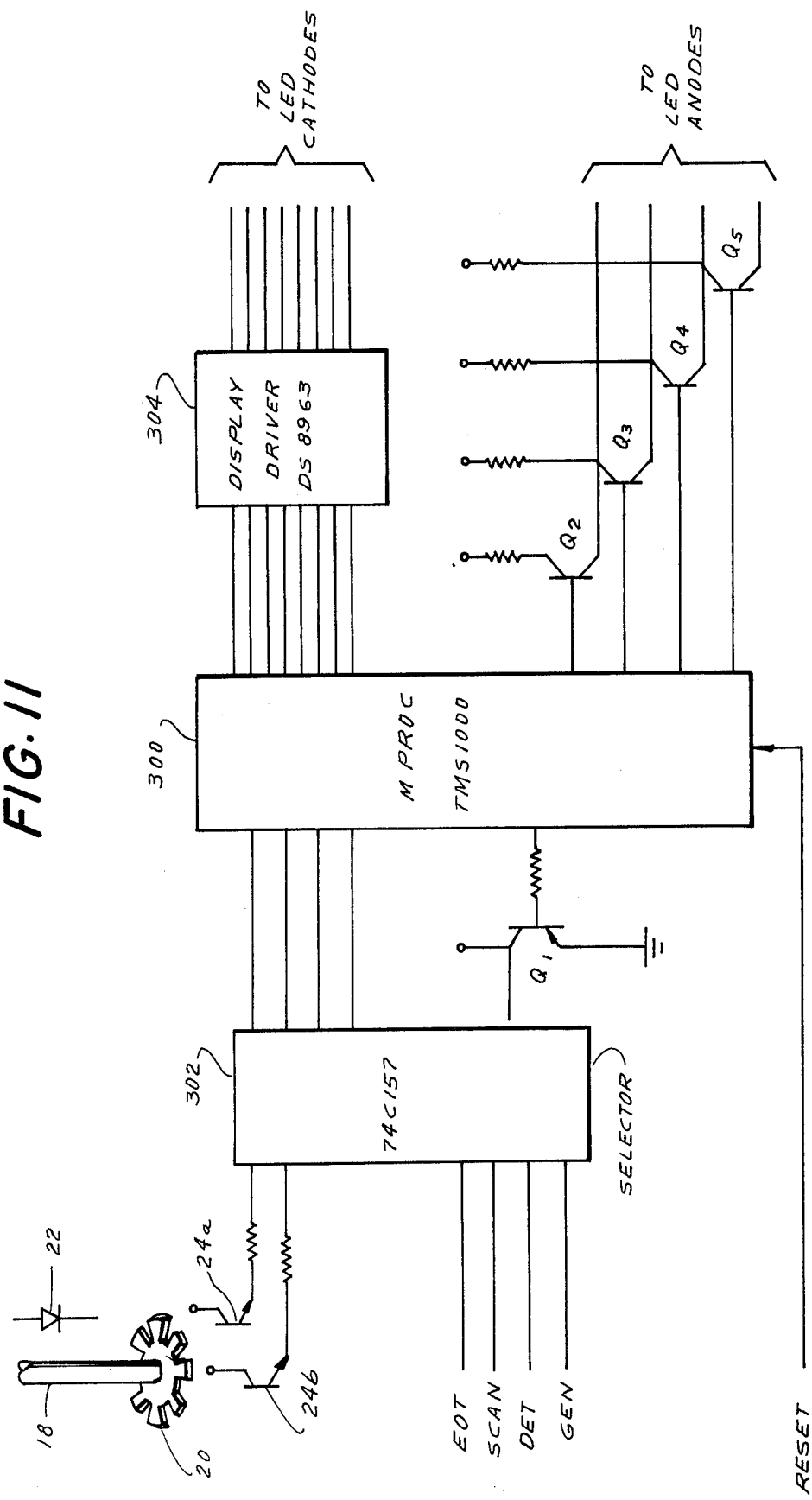
FIG. 11 is a circuit diagram of one practical embodiment of the present invention.

The apparatus shown and described hereinabove may be constructed of discrete, conventional logic circuits, as are known to those of ordinary skill in the art. The functions of such logic circuits can be controlled and carried out by a microprocessor, such as Texas Instruments Model TMS 1000. A circuit diagram of such a microprocessor implementation is illustrated in FIG. 11. This embodiment is comprised of a microprocessor 300, a selector circuit 302, a display driver 304 and transistors $Q_1$-$Q_5$. Microprocessor 300 may be the aforementioned Model TMS 1000 and may include an internal clock. The microprocessor includes four data inputs, a reset input, a selector control output, one set of eight outputs and another set of four outputs. The four data inputs of microprocessor 300 are coupled to respective outputs of selector circuit 302. This selector circuit may be similar to aforedescribed selector circuits 74 and 84, an example of which may be Model 74C157, manufactured by Texas Instruments, Inc. A selector control input of selector circuit 302 is coupled to transistor $Q_1$ which, in turn, is driven from the selector control output of microprocessor 300.

Selector circuit 302 includes one set of inputs connected to phototransistors 24a and 24b, described previously with respect to FIG. 1. Another set of inputs of the selector circuit is connected to receive the aforementioned EOT and SCAN signals, as well as indicating signals derived from tone generator 36 and tone detector 38. Depending upon the condition of selector circuit 302, as determined by transistor $Q_1$, either the pulse signals produced by the phototransistors or the EOT, SCAN and indicating signals are supplied to microprocessor 300.

The set of eight data outputs of microprocessor 300 is similar to the outputs produced by selector circuit 84 (FIG. 5). This set of outputs from the microprocessor is connected to display driver 304. This display driver may be similar to digit driver 86, and may be constructed as Model DS 8963, manufactured by Texas Instruments, Inc. The outputs from display driver 304 are connected to groups of cathodes, analogous to groups 92, 94, 96, . . . 98, shown in FIG. 5. In particular, each output of display driver 304 is connected to the common-connected cathodes in a group of such LED's The set of four data outputs from microprocessor 300 are connected to driver transistors $Q_2$–$Q_5$, respectively, these transistors being similar to segment driver 76 (FIG. 5) and each transistor $Q_2$–$Q_5$ being connected to the anode of a respective LED in each group of LED's.

The reset input connected to microprocessor 300 is adapted to supply a RESET signal thereto similar to the RESET signal described in conjunction with the embodiment shown in FIG. 4.

The operation of the system shown in FIG. 11 is similar to the operation shown and described in detail with respect to FIGS. 1-10. Pulses generated by phototransistors 24a and 24b are supplied by selector circuit 302 to microprocessor 300 as tape T is driven. These pulses are used in the microprocessor to increment or decrement a counter, similar to counter 52 described above. The count of this counter is stored in the microprocessor, similar to the storage of this count by cursor register 78. In addition, the microprocessor includes a memory, analogous to memory 50, in which indicating signals supplied to the microprocessor by selector circuit 302 are stored at storage locations corresponding to the count then obtaining by the counter included in the microprocessor. SCAN and EOT signals, which also are supplied to microprocessor 300 by the selector circuit, perform the same operation as described above for these signals.

During a scan or dictate operation, indicating signals are stored in the memory included in microprocessor 300; and during normal operation of the apparatus with which the system shown in FIG. 11 is used, the stored indicating signals are used by the microprocessor to selectively control display driver 304 and transistors $Q_2$–$Q_5$ so as to energize respective LED's to provide indications of the locations of tone signals which are recorded on tape T. For this purpose, the microprocessor is adapted to perform functions analogous to those performed by aforedescribed timing control circuit 72, multiplexer 70 and selector circuits 74 and 84. In addition, the counter included in the microprocessor is capable of being read out, analogous to the reading out of cursor register 78, to have its count decoded and used to selectively drive display driver 304 and transistors $Q_2$–$Q_5$ for the purpose of providing a cursor indication of the present position of tape T.

The microprocessor further performs a function analogous to the cursor position adjustment operation performed by the apparatus shown in FIG. 9. Hence, in the event that tape is rapidly advanced to a location at which a tone signal is recorded, and because of tape stretching or slippage, the cursor indication of the present position of the tape is indicated as being adjacent an instruction indication location, the cursor indication is shifted so as to coincide with this instruction indication.

In view of the detailed discussion of FIGS. 1-10, and further in view of the structural embodiments depicted in those figures, it is recognized that one of ordinary skill in the art would be readily enabled to suitably program microprocessor 300 so as to perform the various functions discussed above.

While the present invention has been particularly shown and described with respect to certain preferred embodiments thereof, it will be readily apparent to one of ordinary skill in the art that various changes and modifications in form and details can be made without departing from the spirit and scope of the invention. For example, although the record medium has been described as a tape housed within a tape cassette, it is appreciated that other forms of tape can be used, such as reel-to-reel, an endless loop, and the like. Furthermore, the record medium need not be limited to tape. Instead, a magnetic sheet, disc, belt or other recording media can be used. As another modification, the display elements need not be limited solely to one or more arrays of light sources, such as LED's. Seven-segment arrays, as shown in FIG. 3, can be used to provide indications of the locations of tone signals, or instruction signals, as well as overall length of recorded medium and the present position of such medium. Such arrays may be formed of vacuum fluorescent devices, liquid crystal devices, plasma discharge devices, seven-segment LED displays, a CRT display, or other electronic, selectively energizable/erasable display elements. Furthermore, as mentioned previously, the tone signals, or coded tone signals, may represent various instructions to be indicated, which instructions are advantageously utilized in a dictation/transcription system. As yet another modification, the cursor indication may be provided either by a flashing LED, as described above, or by an LED energized to have a particular color. This can be achieved by providing dual-encapsulated LED's in a single package, or by providing a separate array of differently-colored LED's. Still further, it may not be necessary to use both timing phase signals $\phi_9$ and $\phi_{10}$ to provide the display of the cursor indication. One of these timing phase signals can be used to establish a time period during which the aforedescribed cursor adjustment operation is carried out.

It is intended that the appended claims be interpreted as including the foregoing as well as various other such changes and modifications.

What is claimed is:

1. Apparatus for displaying the relative locations of particular information recorded on a movable record medium, the presence of said particular information being represented by a predetermined signal, comprising:

means for generating electronic pulses as said record medium moves past a reference position, each pulse representing a predetermined amount of record medium;

electronic counting means responsive to said electronic pulses for counting said pulses, the count of said counting means being selectively incremented or decremented in accordance with the direction of movement of said record medium;

means responsive to said predetermined signal for providing an indicating signal;

memory means having a plurality of addressable storage locations for storing indicating signals, the count of said counting means serving as an address for said memory means so that said indicating signal, if provided, is stored at a storage location determined by the present count of said counting means at the time that said indicating signal is produced; and display means responsive to the signals stored in said memory means for displaying the locations on said record medium at which said predetermined signals are recorded so as to provide a single visual appearance of all of said locations at which said predetermined signals are recorded.

2. The apparatus of claim 1 further comprising signal generating means for generating said predetermined signal and recording means for recording said predetermined signal on said record medium; and wherein said means for producing an indicating signal is responsive to said signal generating means.

3. The apparatus of claim 1 further comprising signal detecting means for detecting said predetermined signal and playback means for playing back said predetermined signal from said record medium and supplying same to said detecting means; and wherein said means for producing an indicating signal is responsive to said signal detecting means.

4. The apparatus of claim 1 wherein said display means comprises a plurality of visual indicators; energizing means for selectively energizing said visual indicators; and means for actuating said energizing means in accordance with the storage location of said memory means in which an indicating signal is stored.

5. The apparatus of claim 4 wherein said visual indicators comprise an array of indicators, each indicator being associated with a respective predetermined storage location of said memory means.

6. The apparatus of claim 5 wherein said array of indicators is arranged in groups, each group having a plurality of indicators; and said energizing means comprises group driving means for driving a selected one of said groups and individual driving means for driving individual ones of said indicators included in a group.

7. The apparatus of claim 6 wherein said storage locations are arranged in groups, and wherein said means for actuating said energizing means comprises scanning means for concurrently scanning groups of said storage locations of said memory means and corresponding groups of said indicators, thereby enabling each scanned group of indicators; read-out means for reading out those storage locations in a group in which indicating signals are stored; and means for actuating those individual driving means corresponding to the read-out storage locations, whereby selective indicators in a scanned group are energized.

8. The apparatus of claim 7 wherein said scanning means comprises cyclical, sequential scanning means for scanning said groups of storage locations and indicators respectively and in a predetermined sequence.

9. The apparatus of claim 6 wherein said individual driving means comprises a plurality of gate means, each having an output coupled to a respective indicator, a first input coupled to a respective storage location of said memory means, and a second input coupled to said group driving means.

10. The apparatus of claim 9 wherein said group driving means comprises scanning means for enabling groups of said gate means repetitively and in a predetermined sequence, whereby an enabled gate means energizes its associated indicator if said first input of said enabled gate means is provided with a stored indicating signal.

11. In a system for recording and/or playing back dictation on a movable record medium, apparatus for displaying the approximate present position on said record medium whereat said dictation then is being recorded or played back by the user of said system and for displaying the relative locations of particular information recorded on said record medium, the presence of said particular information being represented by predetermined signals, said apparatus comprising:

means for generating electronic pulses corresponding to the movement of predetermined amounts of said record medium past a record/playback position;

electronic counting means responsive to said electronic pulses for counting said pulses, the count of said counting means being selectively incremented or decremented in accordance with the direction of movement of said record medium;

means responsive to said predetermined signal for producing an indicating signal;

memory means having a plurality of addressable storage locations for storing an indicating signal at a storage location whose address is determined by the present count of said counting means at the time that said indicating signal is produced;

display means operative in response to the signals stored in said memory means for displaying the locations on said record medium at which said predetermined signals are recorded so as to provide a single visual appearance of all of said locations at which said predetermined signals are recorded; and means for causing said display means to be additionally operative in response to the count of said counting means for displaying the present position on said record medium corresponding to said count.

12. In a system for recording and/or playing back dictation on a movable record medium, apparatus for displaying the approximate present position on said record medium whereat said dictation then is being recorded or played back by the user of said system and for displaying the relative locations of particular information recorded on said record medium as represented by predetermined signals, said apparatus comprising:

means for generating electronic pulses corresponding to the movement of predetermined amounts of said record medium past a record/playback position;

electronic counting means responsive to said electronic pulses for counting said pulses, the count of said counting means being selectively incremented or decremented in accordance with the direction of movement of said record medium;

means responsive to said predetermined signal for producing an indicating signal;

memory means having a plurality of storage locations corresponding to the counts of said counting means for storing an indicating signal at a storage location corresponding to the present count of said counting means at the time that said indicating signal is produced;

display means operative in response to the signals stored in said memory means for displaying the locations on said record medium at which said predetermined signals are recorded and being operative, additionally, in response to the count of said counting means for displaying the present position on said record medium corresponding to said count, said display means comprising an array of indicators, each indicator being associated with a respective storage location of said memory means; energizing means for selectively energizing said indicators; and selector means for selectively actuating said energizing means in accordance with the storage location of said memory means in which an indicating signal is stored and for selectively actuating said energizing means in accordance with the count of said counting means so as to provide a distinctive cursor representing the present position on said record medium.

13. The apparatus of claim 12 wherein said selector means comprises means for receiving the count of said counting means representing the approximate present position on said record medium; timing means for establishing sequential, periodic timing intervals; means operative during some of said timing intervals for actuating said energizing means to energize those indicators associated with storage locations of said memory means in which indicating signals are stored; and means operative during others of said timing intervals for actuating said energizing means to energize the one indicator corresponding to the count representing said approximate present position.

14. The apparatus of claim 13, further including a source for providing a slowly alternating signal; and means for supplying said slowly alternating signal to said means for actuating said energizing means to cause said one indicator to flash at a visually perceptible rate, thereby constituting said distinctive cursor.

15. The apparatus of claim 14 wherein said indicators are arranged in groups, each group including a plurality of indicators, and said storage locations are arranged in groups; and said timing means comprises scanning means for concurrently scanning groups of said storage locations of said memory means and corresponding groups of said indicators in sequence during said some timing intervals to enable each scanned group of indicators; memory read-out means for reading out the stored indicating signals from a scanned group of storage locations to energize associated indicators in said scanned group of indicators; and count read-out means operative during said other timing intervals for reading out the count representing said approximate present position to energize the indicator associated with said read out count.

16. The apparatus of claim 14 wherein said energizing means comprises a plurality of gate means, each gate means having an output connected to a respective one of said indicators and an input connected to an associated storage location, and said timing means comprises scanning means for sequentially scanning said gate means to enable each of said gate means to energize an indicator if an indicating signal is stored in the associated storage location of said memory means during said some timing intervals; and count read-out means operative during said other timing intervals for reading out the count representing said approximate present position to energize the indicator associated with said read out count.

17. The apparatus of any of claims 11, 12, 13, 14, 15 or 16 wherein said counting means comprises a coarse counting section whose count is changed when a block of said record medium of predetermined size moves past said record/playback position and a fine counting section whose count is changed when an increment smaller than said block moves past said record/playback position; and further including cursor register means for storing the coarse count of said coarse counting section; and means for modifying said stored coarse count in the event that the fine count of said fine counting section indicates that the present position on said record medium is within a predetermined distance from an adjacent block and an indicating signal is stored in the storage location of said memory means corresponding to said adjacent block.

18. The apparatus of claim 17 wherein said means for modifying comprises first detecting means for detecting when said fine count is within a first range representing that said present position is within said predetermined distance from one adjacent block; second detecting means for detecting when said fine count is within a second range representing that said present position is within said predetermined distance from another adjacent block; sensing means for sensing if an indicating signal is stored in the storage location of said memory means corresponding to said one or other adjacent block; and means for replacing said stored coarse count with the coarse count corresponding to said one adjacent block in response to said first detecting means if said indicating signal is stored in the storage location corresponding to said one adjacent block and with the coarse count corresponding to said other adjacent block in response to said second detecting means if said indicating signal is stored in the storage location corresponding to said other adjacent block.

19. The apparatus of claim 18 wherein said sensing means comprises subtracting means responsive to said first detecting means for subtracting a count of one from said coarse count; adding means responsive to said second detecting means for adding a count of one to said coarse count; and comparing means for comparing the coarse count minus one, the coarse count, and the coarse count plus one, respectively, to corresponding storage locations in said memory means for sensing whether the compared storage location has an indicating signal stored therein.

20. The apparatus of claim 19 wherein said means for replacing said stored coarse count comprises gating means for gating said coarse count minus one into said cursor register means if the storage location corresponding to said coarse count minus one has an indicating signal stored therein and the storage location corresponding to said coarse count does not have an indicating signal stored therein, and for gating said coarse count plus one into said cursor register means if the storage location corresponding to said coarse count plus one has an indicating signal stored therein and the storage location corresponding to said coarse count does not have an indicating signal stored therein.

21. In dictation and/or transcription apparatus operable with a movable record medium divisible into successive blocks in which dictation is recorded, display apparatus for displaying whether predetermined signals are recorded in said blocks and for simultaneously displaying the one block then in operative position in said dictation and/or transcription apparatus, comprising:
  pulse generating means for generating electronic pulses as predetermined amounts of said record medium move past an operative position in said dictation and/or transcription apparatus;
  electronic counting means having a fine counting section for counting said pulses in a direction determined by the direction of movement of said record medium to provide a fine count representing the number of increments in a block which have been moved past said operative position, and having a coarse counting section responsive to said pulses for providing a coarse count representing the particular block then in operative position in said dictation and/or transcription apparatus;
  means for producing an indicating signal when a predetermined signal is recorded on or reproduced from said record medium;

memory means having a number of storage locations corresponding to the number of blocks on said record medium, each of said storage locations being adapted to store an indicating signal therein;

means for supplying said indicating signal to said memory means for storage in the storage location corresponding to the coarse count of said coarse counting section;

an array of visual indicators, each indicator being associated with a respective block on said record medium;

means for energizing those indicators corresponding to the storage locations in which indicating signals are stored and the one indicator corresponding to the coarse count of said coarse counting section, said one indicator being energized as a cursor representing the approximate present position of said record medium in operative position in said dictation and/or transcription apparatus;

sensing means for sensing when the fine count provided by said fine counting section is equal to predetermined counts representing that the left fringe or right fringe, respectively, of a block on said record medium is in operative position; and means for energizing the left adjacent indicator as said cursor when said sensing means senses that the left fringe of a block is in operative position, provided an indicating signal is stored in the storage location associated with said left adjacent indicator and an indicating signal is not stored in the storage location associated with said block then in operative position; and for energizing the right adjacent indicator as said cursor when said sensing means senses that the right fringe of a block is in operative position, provided an indicating signal is stored in the storage location associated with said right adjacent indicator and an indicating signal is not stored in the storage location associated with said block then in operative position.

22. The apparatus of claim 21 wherein said means for energizing those indicators corresponding to the storage locations in which indicating signals are stored and the cursor indicator comprises cursor register means for storing said coarse count; timing means for generating sequential timing intervals; and multiplexing means responsive to said timing means for using the indicating signals stored in said memory means to energize selected ones of said indicators during some of said timing intervals and for using the coarse count stored in said cursor register means to energize a selected indicator as said cursor indicator during at least one of the remaining timing intervals.

23. The apparatus of claim 21 or 22 wherein said means for energizing the left and right adjacent indicators comprises subtracting means for subtracting a count of one from said coarse count when the left fringe of a block on said record medium is in operative position; adding means for adding a count of one to said coarse count when the right fringe of a block on said record medium is in operative position; comparing means for comparing the coarse count minus one, the coarse count and the coarse count plus one, respectively, to corresponding storage locations to detect whether an indicating signal is stored in said corresponding storage locations; and means for using said coarse count minus one to energize said cursor indicator if an indicating signal is stored in the storage location corresponding to said coarse count minus one but not in the storage location corresponding to said coarse count, and for using said coarse count plus one to energize said cursor indicator if an indicating signal is stored in the storage location corresponding to said coarse count plus one but not in the storage location corresponding to said coarse count.

24. In transcription apparatus for transcribing information from a record medium and including scanning means for scanning a variable length of said record medium normally prior to a transcription operation for ascertaining the locations of predetermined signals recorded along said variable length, display apparatus for displaying the relative locations of said predetermined signals, comprising:

means for providing a scanning signal while said record medium is scanned from an indeterminate position thereon back to a beginning position;

detecting means for detecting said predetermined signals while said record medium is being scanned and for producing an indicating signal in response to each detected predetermined signal;

electronic pulse generating means for generating an electronic pulse as a predetermined amount of said record medium is scanned;

electronic counting means for counting said pulses and for providing a count corresponding to a location on said record medium being scanned;

reset means for resetting said counting means to an initial count, said initial count being decremented by said pulses;

memory means having addressable storage locations for storing each produced indicating signal in a location whose address is determined by the count of said counting means at the time that an indicating signal is produced;

shift pulse generating means responsive to the termination of said scanning signal when the beginning position of said record medium is scanned for generating periodic shift pulses;

means for applying said shift pulses to said counting means to continue to decrement the count thereof until a preset count is reached, and to said memory means to shift the contents of the storage locations thereof to successive new storage locations in response to each shift pulse until said preset count is reached; and display means responsive to the indicating signals stored in said memory means for displaying the locations on said record medium at which said predetermined signals are recorded.

25. The apparatus of claim 24 further comprising means responsive to said preset count of said counting means to deactivate said shift pulse generating means and thereby terminate said shift pulses.

26. The apparatus of claim 25 further comprising means for producing a simulated indicating signal at the commencement of said scanning signal, whereby said simulated indicating signal is stored in the storage location whose address is determined by said initial count.

27. The apparatus of claim 24, 25 or 26 wherein said display means comprises an array of energizable visual indicators, each indicator being associated with a respective storage location for displaying whether said respective storage location has an indicating signal stored therein.

28. The apparatus of claim 27 wherein said indicators indicate the shifting of the contents of said storage locations in response to said shifting pulses following said termination of said scanning signal.

29. The apparatus of claim 28 wherein said array of indicators is a linear array and said record medium is a magnetic tape, said indicators being energized in a right-to-left direction as said tape is being scanned and being further energized successively in said right-to-left direction in response to said shifting pulses to provide a resultant display in left-to-right orientation of the corresponding locations of predetermined signals on said magnetic tape.

30. In a transcribing machine having a transducer for transcribing dictated information recorded on a magnetic tape, which tape also has tone signals recorded thereon, display apparatus for displaying the relative locations of said tone signals on said tape and for simultaneously displaying a cursor representing the approximate present position of said tape proximate said transducer, said display apparatus comprising:
   pulse generating means for generating pulses as said tape is transported;
   counting means for counting said pulses to produce an output count that is incremented when said tape is transported in a first direction and to produce an output count that is decremented when said tape is transported in a second direction;
   an array of light sources;
   energizing means for energizing selected ones of said light sources as a function of the count produced by said counting means, said energizing means being operative to flash a selected light source at a distinctive rate to provide said cursor representing the approximate present position of said magnetic tape proximate said transducer;
   memory means having a plurality of addressable storage locations;
   tone detecting means operative during a scanning operation of said magnetic tape to detect said recorded tone signals as said tape is transported;
   means for storing an indication of a detected tone signal in a location of said memory means whose address is determined by said counting means at the time that said tone signal is detected; and
   means for energizing selected ones of said light sources in response to the stored indications in corresponding selected locations of said memory means.

31. The apparatus of claim 30 wherein each output count produced by said counting means represents a predetermined incremental length of said tape that has been transported, and further comprising means for sensing when the present position of said tape proximate said transducer is within a predetermined distance from the incremental length in which a tone signal is recorded; and means responsive to said means for sensing to actuate said energizing means to flash the light source adjacent the light source then being flashed if said adjacent light source is energized in response to the stored indication in a corresponding location of said memory means.

32. In a dictating machine having a transducer for dictating information on a magnetic tape, and for recording tone signals thereon, display apparatus for displaying the relative locations of said tone signals on said tape and for simultaneously displaying a cursor representing the approximate present position of said tape proximate said transducer, said display apparatus comprising:
   pulse generating means for generating pulses as said tape is transported;
   counting means for counting said pulses to produce an output count that is incremented when said tape is transported in a first direction and to produce an output count that is decremented when said tape is transported in a second direction;
   an array of light sources;
   energizing means for energizing selected ones of said light sources as a function of the count produced by said counting means, said energizing means being operative to flash the selected light source at a distinctive rate to provide said cursor representing the approximate present position of said magnetic tape proximate said transducer;
   memory means having a plurality of addressable storage location;
   tone generating means operative to generate and record tone signals as said tape is transported;
   means for storing an indication that a tone signal has been recorded, said indication being stored in a location of said memory means whose address is determined by said counting means at the time that said tone signal is recorded; and
   means for energizing selected ones of said light sources in response to the stored indications in corresponding selected locations of said memory means.

33. In a transcribing machine for reproducing dictated information and tone signals recorded on a magnetic tape, which tone signals are recorded at arbitrary locations on said tape, display apparatus for displaying the relative locations of said tone signals on said tape, comprising:
   memory means having a plurality of addressable storage locations for storing indications of reproduced tone signals therein;
   address generating means for generating an address signal as said tape moves in its forward and reverse directions, the address signal being incremented when a predetermined amount of said tape moves in one of said directions and being decremented when a predetermined amount of said tape moves in the other of said directions;
   means for supplying an indication of a reproduced tone signal to said memory means to be stored in the storage location then being addressed by said address generating means; and
   a plurality of visual display indicators associated with respective storage locations in said memory means, each visual display indicator providing a visual display if an associated storage location has an indication of a reproduced tone signal stored therein.

34. In a recording machine for recording dictated information and tone signals on a magnetic tape, said tone signals being recorded at arbitrary locations on said tape, display apparatus for displaying the relative locations of said tone signals on said tape, comprising:
   memory means having a plurality of addressable storage locations for storing indications of recorded tone signals therein;
   address generating means for generating an address signal as said tape moves in its forward and reverse directions, the address signal being incremented when a predetermined amount of said tape moves in one of said directions and being decremented when a predetermined amount of said tape moves in the other of said directions;

means for supplying an indication of a generated and recorded tone signal to said memory means to be stored in the storage location then being addressed by said address generating means; and a plurality of visual display indicators associated with a respective storage location in said memory means, each visual display indicator providing a visual display if an associated storage location has an indication of a recorded tone signal stored therein.

* * * * *